US012026805B2

(12) United States Patent
Hincapie Ramos et al.

(10) Patent No.: US 12,026,805 B2
(45) Date of Patent: Jul. 2, 2024

(54) AUGMENTED REALITY BASED GEOLOCALIZATION OF IMAGES

(71) Applicant: Google LLC, Mountain View, CA (US)

(72) Inventors: Juan David Hincapie Ramos, Palo Alto, CA (US); Justin Paul Quimby, Oakland, CA (US); Marek Lech Gorecki, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 119 days.

(21) Appl. No.: 17/772,558

(22) PCT Filed: Dec. 31, 2020

(86) PCT No.: PCT/US2020/067610
§ 371 (c)(1),
(2) Date: Apr. 28, 2022

(87) PCT Pub. No.: WO2022/146438
PCT Pub. Date: Jul. 7, 2022

(65) Prior Publication Data
US 2023/0154059 A1     May 18, 2023

(51) Int. Cl.
*G06V 20/20*         (2022.01)
*G06T 11/00*         (2006.01)
(Continued)

(52) U.S. Cl.
CPC ............. *G06T 11/00* (2013.01); *G06V 20/20* (2022.01); *G06V 20/63* (2022.01); *G06V 30/10* (2022.01)

(58) Field of Classification Search
None
See application file for complete search history.

(56) References Cited

U.S. PATENT DOCUMENTS

| 2014/0049652 | A1  | 2/2014 | Moon et al. |
| 2021/0097323 | A1* | 4/2021 | Wei ............................ G06T 7/73 |

FOREIGN PATENT DOCUMENTS

| EP | 3054669 | 8/2016 |
| WO | WO 2019/048924 | 3/2019 |

OTHER PUBLICATIONS

Fragoso et al., "TranslatAR: A Mobile Augmented Reality Translator", IEEE, 2010 (Year: 2010).*

(Continued)

*Primary Examiner* — Nicholas R Wilson
(74) *Attorney, Agent, or Firm* — DORITY & MANNING P.A.

(57) ABSTRACT

Methods, systems, devices, and tangible non-transitory computer readable media for generating geolocalized images are provided. The disclosed technology can access target location data. The target location data can include information associated with an environment from which a target location is within a field of view of a user device. A suitable position of the user device from which an unobstructed view of the target location is within the field of view of the user device and that satisfies one or more criteria can be determined based on the target location data. Furthermore, indications and images of the environment within the field of view of the user device can be generated. The indications can be associated with positioning the user device in the suitable position.

20 Claims, 12 Drawing Sheets

(51) Int. Cl.
  *G06V 20/62* (2022.01)
  *G06V 30/10* (2022.01)

(56) References Cited

OTHER PUBLICATIONS

International Search Report and Written Opinion for Application No. PCT/US2020/067610, dated Sep. 22, 2021, 15 pages.
International Preliminary Report on Patentability for Application No. PCT/US2020/067610, dated Jul. 13, 2023, 10 pages.

* cited by examiner

AUGMENTED REALITY BASED GEOLOCALIZATION OF IMAGES

PRIORITY CLAIM

This application is based upon and claims the right of priority under 35 U.S.C. § 371 to International Application No. PCT/US2020/067610 filed on Dec. 31, 2020. Applicant claims priority to and the benefit of each of such applications and incorporates all such applications herein by reference in their entirety.

FIELD

The present disclosure relates generally to the generation of images and in particular to the generation of geolocalized images using an augmented reality device.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations that are performed and the way in which the operations are performed can vary over time, as can the underlying hardware that implements the operations. Further, the state of the geographic area can change over time and in order to accurately reflect the changed state of the geographic area, the corresponding data describing the geographic area must be updated. Accordingly, there are different ways to leverage computing resources associated with the state of a geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of geolocalized image generation. The computer-implemented method can include accessing, by a user device including one or more processors, target location data. The target location data can include information associated with an environment from which a target location is within a field of view of the user device. The computer-implemented method can also include determining, by the user device, based at least in part on the target location data, at least one suitable position of the user device from which an unobstructed view of the target location that satisfies one or more criteria is within the field of view of the user device. Furthermore, the computer-implemented method can include generating, by the user device, one or more indications and one or more images of the environment within the field of view of the user device. The one or more indications can be associated with positioning the user device in the at least one suitable position.

Another example aspect of the present disclosure is directed to one or more tangible non-transitory computer-readable media storing computer-readable instructions that when executed by one or more processors cause the one or more processors to perform operations. The operations can include accessing target location data. The target location data can include information associated with an environment from which a target location is within a field of view of the user device. The operations can also include determining, based at least in part on the target location data, at least one suitable position of the user device from which an unobstructed view of the target location that satisfies one or more criteria is within the field of view of the user device. Furthermore, the operations can include generating one or more indications and one or more images of the environment within the field of view of the user device. The one or more indications can be associated with positioning the user device in the at least one suitable position.

Another example aspect of the present disclosure is directed to a computing system that can include: one or more processors; and one or more tangible non-transitory computer-readable media storing instructions that when executed by the one or more processors cause the one or more processors to perform operations. The operations can include accessing target location data. The target location data can include information associated with an environment from which a target location is within a field of view of the user device. The operations can also include determining, based at least in part on the target location data, at least one suitable position of the user device from which an unobstructed view of the target location that satisfies one or more criteria is within the field of view of the user device. Furthermore, the operations can include generating one or more indications and one or more images of the environment within the field of view of the user device. The one or more indications can be associated with positioning the user device in the at least one suitable position.

Other example aspects of the present disclosure are directed to other methods, systems, devices, apparatuses, or tangible non-transitory computer-readable media for the generation of geolocalized images.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1A:
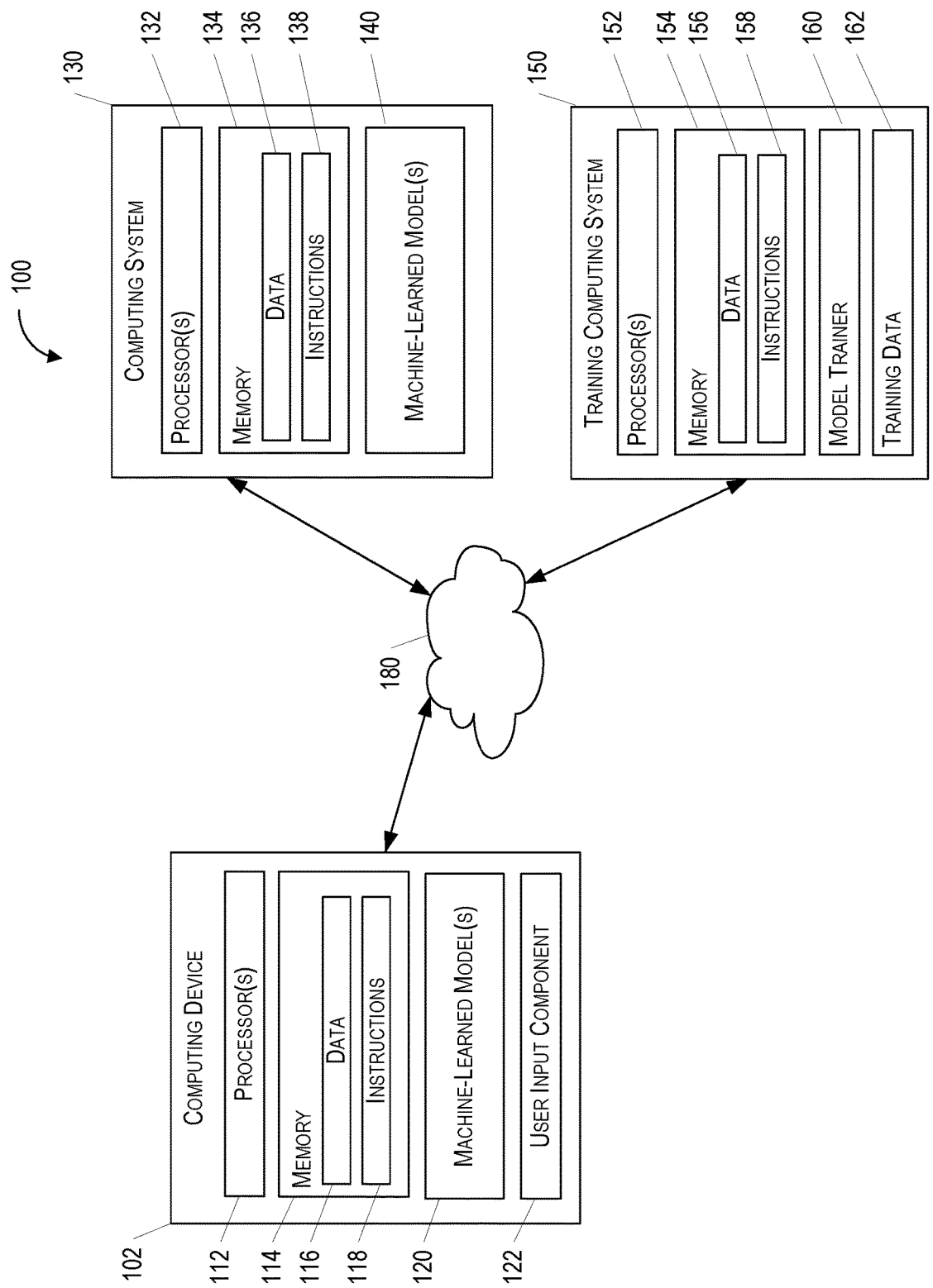
FIG. 1A depicts a block diagram of an example computing system that performs operations associated with augmented reality based generation of geolocalized images according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to the generation of geolocalized images that can be used to more accurately convey the state of a geographic location. In particular, the disclosed technology can use augmented reality techniques to direct the selection and capture of images of an environment that includes a target location which may be associated with existing geolocation data. Further, by formalizing the capture of images that represent the actual state of a target location, the accuracy of associated geolocalized images can be improved and the need for burdensome manual verification of geolocalized images can be reduced.

By way of example, a computing device (e.g., a user device) implementing the disclosed technology can receive a request for target location data that is associated with an environment that includes a target location such as a business that the user wishes to visit. Based on the request, the computing device can access target location data (e.g., map data associated with the geographic location of the business the user wishes to visit) that includes information associated with a portion of the environment from which the business is within a field of view of the user device (e.g., the portion of the environment that can be viewed via the user's smartphone camera). The computing device can then determine a suitable position from which the smartphone can capture an unobstructed view of the business that is within the field of view of the smartphone camera and satisfies criteria including the lighting of the business being sufficiently bright and the business being close enough to capture an image with sufficiently high detail. For example, the user device can analyze the environment and determine where to place the camera so that obstructions including trees or automobiles do not block the camera from capturing a complete picture of the business's facade. The computing device can then generate indications that are superimposed on images of the environment that is displayed on the user device. For example, the indications can highlight the business and display text instructing the user on where to stand in order to capture an image of the business. By directing the capture of an image in this way, the resultant quality of the captured image can be objectively improved, as factors that a user may find difficult to determine (e.g., the proper amount of lighting and/or fine detail that is visible in an image) can be objectively analyzed and processed by a computing device. As a result, a higher quality image may be generated, and the higher quality image may in turn be used for a variety of subsequent processes.

In some instances, the disclosed technology can be implemented as the result of a search via a search application and/or map application. For example, a user that has travelled to a target location (e.g., a Thai restaurant) based on the results of search conducted via a map application may discover that the geolocalized image associated with the target location is not accurate (e.g., the target location is actually a convenience store). To correct the discrepancy between the reported state of the target location and the actual state of the target location, the user may wish to contribute (e.g., upload) an image of the actual target location (e.g., the convenience store) to a remote computing system that can update the target location data that was the basis for providing the target location that was originally provided to the user. The disclosed technology can allow the user of an augmented reality device (e.g., a smartphone and/or augmented reality eyewear) to capture a suitable image (e.g., a well-lit photo showing an unobstructed view of the whole façade of the convenience store) that can be used to update the target location data.

By way of further example, the disclosed technology can perform operations to update the geolocalized data when certain conditions are met. For example, the disclosed technology can determine when a user device is within a predetermined distance of some target location with a state that needs to be confirmed or updated. The user device can then generate indications prompting the user of the user device to confirm the accuracy of a description of a target location. In the event that the target location has not been accurately described, the user can be directed to update the target location data with a current image of the target location. For example, the user can receive an auditory prompt asking the user if a target location in front of the user is (still) a coffee shop. If a coffee shop is no longer located at the target location and the coffee shop is vacant, the user device can generate indications via augmented reality eyewear, in which the user is guided to a suitable position to capture an image of the vacant coffee shop. The target location data associated with the coffee shop can then be updated.

In some embodiments, the disclosed technology can include an augmented reality computing device (e.g., a user device that can generate indications that are superimposed on images of an actual environment depicted on a display of the user device). The augmented reality computing device can be used to generate indications that assist the user in capturing a suitable image that is well-lit, unobstructed, and captured from an angle that shows significant portions of the target location's facade. The indications can, for example, include guide-lines that allow for proper framing of an image of the target location, which can then be used to update the target location data.

As such, the disclosed technology can improve the accuracy and effectiveness of maps and geolocalized images by providing an augmented reality based way of capturing images and information associated with portions of an environment that include target locations. Further, the disclosed technology can provide a way to automatically capture images of a target location when a user computing device is in a suitable position, which may result in a certain objective quality level of the captured image.

Furthermore, the disclosed technology provides an improved technique for human-computer interaction to position a user device so that an objectively higher quality image of a target location may be captured. Through the use of one or more indications, any subjective considerations of a user are not required to achieve the image capture. Instead, the disclosed technology can direct a user to position the user device in a suitable position for capturing an image of the target location. An image captured by using these techniques is therefore suitable for various subsequent processes due to its objective quality which can include updating target location data.

The user device can receive, obtain, access, and/or retrieve a request for target location data. The target location data can be associated with an environment that can include a target location. For example, the user device can receive a request for target location data about a target location within a predetermined distance of the user device.

In some embodiments, the target location data can include information associated with a predetermined geographic area (e.g., a thirty (30) meter radius around the target location or the user device, or a fifteen (15) meter by fifteen (15) meter square around the target location), or a portion of the environment from which the target location is within a field of view of the user device. For example, the target location data can include data associated with a geographic area that includes the environment within the field of view of the user device. The field of view can include the field of view from a single position (e.g., the field of view of a camera that is fixed in one direction and in a fixed location) or a field of view from multiple positions at a single location (e.g., the field of view of a camera that is rotated three-hundred and sixty (360) degrees around from a fixed location).

The target location data can include one or more geolocalized images (e.g., images that are associated with a geographic location and/or information about that geographic location) and/or geolocation data (e.g., data associated with one or more geographic locations of one or more objects respectively). The target location data can include information associated with one or more target locations. For example, the target location data for a geographic area that is one-hundred (100) meters long and one-hundred (100) meters wide may include multiple target locations including shops, restaurants, garages, monuments, parking lots, and any other location.

Furthermore, the target location data can include information associated with one or more locations of one or more entrances, one or more locations of one or more exits, and/or one or more locations of one or more signs. Each of the one or more locations of one or more entrances, one or more locations of one or more exits, and/or one or more locations of one or more signs can be associated with a respective target location. The target location data may include information indicating whether a target location is just an exit (e.g., subway exits that only allow passengers to exit the subway), just an entrance (e.g., subway exits that only allow a passenger to enter the subway), or both an exit and an entrance.

In some embodiments, the target location data can include one or more portions of map data and/or be included as a part of one or more portions of map data. Further, the target location data can be interchangeable with one or more portions of map data. Further, the target location data can include information associated with one or more states of one or more geographic locations and/or one or more objects within the respective one or more geographic locations. The one or more geographic locations can include one or more target locations.

The user device can access target location data. The target location data can include information associated with an environment from which a target location (or some portion of the target location) is within a field of view of the user device. In some embodiments, the environment can include a geographical area within some predetermined distance of the user device. The field of view of the user device can include any portion of the environment that can be within the field of view of the user device from the current location of the user device (e.g., portions of the environment that would be within the field of view of the user device if the user device were turned in a different direction). The field of view of the user device can include any portion of the environment that is visible from a current location of the user device; and/or any portion of the environment that would be visible from the current location of the user device if the user device were pointed in any direction (e.g., pointed in any direction including any direction of the horizontal plane and/or vertical plane of the environment). For example, the field of view can include a field of view anywhere to the front of the user device, the back of the user device, the left of the user device, the right of the user device, above the user device, and/or below the user device.

In some embodiments, the field of view of the user device can be a predetermined field of view based at least in part on the current location of the user device. For example, the field of view of the user device can include any portion of the environment that is within a predetermined distance (e.g., one-hundred (100) meters) of current location of the user device.

The target location data can be accessed, based at least in part on the request for target location data. For example, the request for target location data can be received by the user device, which in response to receiving the request can access the target location data. By way of further example, the user device can access target location data that includes information associated with an area within some predetermined distance of the user device (e.g., a twenty (20) meter radius of the user device).

The user device can determine, based at least in part on the target location data, at least one suitable position of the user device from which an unobstructed view of the target location that satisfies one or more criteria is within the field of view of the user device. An unobstructed view of the target location can include a view from which some predetermined portion of the target location is visible within the field of view of the user device. In some embodiments, an unobstructed view of the target location can include a view in which some predetermined portion of the target location is within the field of view of the user device. For example, an unobstructed view of the target location can include a view from which the entirety of the target location is within the field of view of the user device. In some embodiments, an unobstructed view of the target location can include a view from which a portion (e.g., ninety percent (90%), seventy-five percent (75%)) of the target location is within the field of view of the user device. Further, the unobstructed view of the target location can include a view in which the target location is not occluded and/or not obscured when viewed from the field of view of the user device. The user device can be configured to determine when an object is blocking a target location and/or when the lighting on the target location is too dim or the angle of the target location with respect to the user device does not allow the target location to be entirely within the field of view of the user device (e.g., a camera of the user device).

The user device can generate one or more indications and one or more images of the environment within the field of view of the user device. The one or more indications can be associated with positioning the user device in the at least one suitable position. For example, the user device can generate one or more visual indications that highlight the target location in a display component of the user device and overlay the one or more visual indications over one or more images of the target location. In some embodiments, when the one or more indications are superimposed over one or images, the user device can reduce the brightness of the one or more images. In this way, the one or more indications can be more prominent and/or visible.

In some embodiments, the one or more indications can include one or more geolocalized images that are associated with the environment that is within the field of view of the user device. The one or more geolocalized images can include the geographic location (latitude, longitude, and/or altitude) of the environment within the field of view of the user device. Further, the one or more geolocalized images can include information about that the environment within the field of view of the user device including information about one or more objects within the environment (e.g., the location of entrances/exits, the name of a target location, the hours of operation of a target location, and/or the identity of one or more objects within a predetermined distance of the target location).

The user device can capture an image of the target location when the user device is in the at least one suitable position. For example, a user device can include at least one camera with a field of view. The at least one camera can be used to capture one or more images (e.g., color images) of an environment that is in the field of view of the camera. Further, in some embodiments, the user device can be a mobile device (e.g., a smartphone) that can be aimed or directed at the target location. Further, the user device can include one or more machine-learned models that are configured and/or trained to detect and/or classify visual features of one or more objects including the target location (e.g., a doorway to a business) and upon determining that the visual features are associated with the target location and within the field of view of the user device, capturing an image of the target location when one or more criteria are satisfied (e.g., satisfying the one or more criteria can include the lighting of the target location meeting or exceeding a threshold amount of lighting).

In some embodiments, the user device can include one or more image capture components (e.g., one or more cameras). For example, the user device can include one or more cameras that can be used to capture one or more images of the environment in the field of view of the user device. The user device can include various types of cameras that can capture still images and/or a video stream.

The user device can update the target location data based at least in part on the image of the target location when the user device is in the at least one suitable position. For example, the user device can access the target location data and add the image of the target location to the target location data. Further, the user device can update the target location data by adding information including the time the image was captured, the name of the target location, and/or the type of business associated with the target location to the target location data.

The user device can receive a user input from a user. The input can be associated with one or more interactions by the user with a search for the target location via a map application and/or a search application. The user device can include a user interface that a user can interact with (e.g., touching user interface elements of a touchscreen). The user device can, for example, receive an input from the user that includes a search for a target location via a map application that is operated on the user device. After arriving at the target location, the user may determine that the information associated with the target location is not accurate (e.g., the hours of operation are incorrect). The user can then provide an input to the map application by touching user interface elements that allow the user to contribute a photograph of the hours of operation that are associated with the target location.

The user device can generate a request for target location data based at least in part on the input from the user. For example, the user device can send the request for target location data to a remote computing device (e.g., a remote map server computing device) that includes target location data that is associated with the target location indicated in the input from the user. In some embodiments, accessing the target location data can be based at least in part on the request for the target location data that is generated (e.g., generated based at least in part on the input from the user).

The user device can determine a current location of the user device. For example, the user device can include a location component and/or a navigation component that can receive wireless signals (e.g., GPS signals) associated with the location of the user device.

The user device can generate the request for target location data when the user device is within a predetermined distance of the target location. For example, the user device can compare the location of the user device to the location of the target location. When the user device is within the predetermined distance (e.g., twenty (20) meters) of the target location, the user device can generate a request. The request can include a prompt asking the user to confirm that the target location included in the target location is accurate or if the target location is not included in the target location data, to add an image of the target location to the target location data. In some embodiments, accessing the target location data can be based at least in part on the request for the target location data that is generated (e.g., generated based at least in part on the location of the user device).

Determining the at least one suitable location can include determining, based at least in part on the target location data, at least one location and orientation of the user device relative to the target location from which an unobstructed view of the target location is within the field of view of the user device. The orientation can include a yaw, pitch, and roll of the user device. For example, the user device can analyze the spatial relationships between the target location and one or more objects in the environment to determine a location at which the user device can be placed in order to have an unobstructed view of the target location.

Determining the at least one suitable location can include determining, based at least in part on application of one or more optical character recognition techniques, that the user device is in a suitable position when an unobstructed view of one or more portions of predetermined text is located within a predetermined distance of the target location is within the field of view of the user device. For example, the user device can perform one or more optical character recognition techniques to determine whether text associated with a target location (e.g., a sign indicating the name of a business) is within a field of view of the user device. The user device can then determine whether any of the characters in the text associated with the target location are obstructed and/or illegible.

Determining the at least one suitable location can include detecting one or more objects within a predetermined distance of the target location. The user device can include one or more sensors (e.g., one or more LiDAR devices and/or one or more cameras) configured to detect one or more objects around the user device. Further, detection of the one or more objects can include the use of any combination of the target location data and/or information generated by the one or more sensors.

Further, determining the at least one suitable location can include determining the at least one suitable position of the user device from which an image of the target area can be captured without being obstructed by the one or more objects. Based at least in part on the detection of one or more objects around the user device, the user device can determine a suitable position including a location and orientation of the user device relative to the target location.

Determining the at least one suitable location can include determining, based at least in part on one or more machine-learned models, when one or more key features are visible within the field of view of the user device. For example, the user device can include one or more machine-learned models that are configured to detect and/or identify one or more key features that are visible in the field of view of the user device.

Further, determining the at least one suitable location can include determining that the one or more key features are within a field of view of the user device from the at least one suitable location. For example, a target location may include an identifying sign, which can be determined to be a key feature. Satisfying the one or more criteria for the at least one suitable location can include the identifying sign being within the field of view of the user device from the suitable location.

The one or more key features can include any visual features associated with a target location. For example, the one or more key features can include any combination of shapes, colors, and/or patterns associated with the target location. Further, the one or more key features can include one or more features of one or more objects including an entrance, an exit, and/or signage associated with the target location.

In some embodiments, satisfying the one or more criteria can include a brightness of the target location satisfying one or more brightness criteria (e.g., exceeding a brightness threshold), an angle of the target location relative to the user device being within a range of suitable angles (e.g., the user device is not more than forty (40) degrees past the perpendicular of the front of a target location), and/or a distance from the user device to the target location being within a range of suitable distances (e.g., the user device is between three (3) and twenty (20) meters from the front of the target location).

The target location data can include one or more anchored cues associated with one or more objects in the environment that are within a predetermined distance of the target location. Further, the one or more anchored cues (e.g., world-anchored cues) can include one or more visual cues that are associated with actual objects in the environment. For example, a prominent lamp-post with a known location (e.g., a known latitude, longitude, and altitude) can be used as a basis for determining the position of a user device relative to target location. Further, the one or more anchored cues can be associated with one or more indicators that can be used to guide and/or assist a user in positioning the user device (e.g., a camera of the user device) at a location and/or orientation from which the target location is within a field of view of the user device. For example, the indicators can indicate that an unobstructed view of the target location may be available if the user device is positioned near the lamp-post.

Further, generating the one or more indications can include determining one or more locations of the one or more anchored cues, respectively. For example, the user device can access the target location data which can include the one or more locations of the one or more objects associated with one or more anchored cues. The user device can then, for example, generate one or more indications that highlight and/or label the one or more anchored cues.

In some embodiments, the one or more indications can include one or more highlighted indications around the target location. For example, the one or more indications can include one or more shapes (e.g., squares, rectangles, and/or circles) that are highlighted in prominent colors (e.g., some combination of bright red, green, orange, yellow, or white) around the target location.

In some embodiments, the request for target location data can be received from a remote computing device (e.g., a remote server computing device that serves map data) and can include a request for confirmation of one or more states of the target location. For example, the request for target location data can be sent from a remote computing device that provides target location data to the user device and can send a request for target location data to the user device when a target location is marked as being inaccurate (e.g., an image or description of a target location does not match the actual target location).

Further, the one or more states of the target location can include one or more identifiers associated with the target location and/or one or more hours of operation associated with the target location. For example, the request for target location data can request confirmation that the hours of operation for a restaurant are accurate.

In some embodiments, the one or more indications can include one or more indications associated with prompting a user of the user device to confirm that the unobstructed view of the target location that satisfies one or more criteria is within the field of view of the user device. For example, the one or more indications can include a prompt the user to move the user device until an unobstructed view of the target location that is sufficiently brightly lit is within the field of view of the user device.

In some embodiments, the user device can include an augmented reality device that can include one or more sensors, augmented reality eyewear, an augmented reality headset, and/or one or more display devices. Further, the one or more sensors can include one or more cameras, one or more light detection and ranging (LiDAR) devices, one or more sonar devices, and/or one or more radar devices.

In some embodiments, the one or more indications can be superimposed over the one or more images of the target location. Further, the one or more indications can be brighter than the one or more images of the target location. For example, if the target location is the entrance to a business, the user device can superimpose a bright orange rectangle over the edge of an image of the entrance (e.g., a door).

In some embodiments, the disclosed technology can include a computing system (e.g., a user device) that can include one or more computing devices (e.g., devices with one or more computer processors and a memory that can store one or more instructions) that can send, receive, process, generate, and/or modify data (e.g., data including target location data associated with one or more locations) including one or more information patterns or structures that can be stored on one or more memory devices (e.g., one or more random access memory devices) and/or one or more storage devices (e.g., one or more hard disk drives and/or one or more solid state memory drives); and/or one or more signals (e.g., electronic signals). The data and/or one or more signals can be exchanged by the computing system with various other systems and/or devices including a plurality of service systems (e.g., one or more remote computing systems, one or more remote computing devices, and/or one or more software applications operating on one or more computing devices) that can send and/or receive data including target location data associated with images (e.g., digital images associated with data including geographic location, time of image capture, and/or one or more descriptions of one or more other features of the images). In some embodiments, the computing system (e.g., the geographic computing system) can include one or more features of the computing device 102 that is depicted in FIG. 1A and/or the computing device 200 that is depicted in FIG. 2. Further, the user device can be associated with one or more machine-learned models that include one or more features of the one or more machine-learned models 120 that are depicted in FIGS. 1A-D.

Furthermore, the computing system can include specialized hardware (e.g., an application specific integrated circuit) and/or software that enables the computing system to perform one or more operations specific to the disclosed technology including receiving a request for target location data associated with an environment including a target location; accessing, based at least in part on the request, target location data including information associated with a portion of the environment from which the target location is within a field of view of a user device; determining, based at least in part on the target location data, at least one suitable position of the user device from which an unobstructed view of the target location that satisfies one or more criteria is within the field of view of the user device; and generating one or more indications and one or more images of the environment within the field of view of the user device.

The systems, methods, devices, apparatuses, and tangible non-transitory computer-readable media in the disclosed technology can provide a variety of technical effects and benefits including an improvement in the generation of geolocalized images and/or geolocalized data that can more accurately convey the state of a geographic location. Further, the disclosed technology may assist a user (e.g. a user of an augmented reality device) in performing a technical task (e.g. confirming the accuracy of geolocation data associated with an image) by means of a continued and/or guided human-machine interaction process. The disclosed technology may also provide benefits including improved usage of computational resources and more efficient use of communications networks.

The disclosed technology can improve the usage of computational resources by reducing the need to verify the accuracy of geolocalized data which can include geolocalized images. For example, manual verification of geolocalized data requires burdensome evaluation of individual images to determine whether an image associated with a target location is accurate and/or a suitable representation of the target location. By automating parts of the process of generating the images, the disclosed technology can greatly improve the quality of images of target locations as well as increase the likelihood that the captured image is an accurate representation of the target location. Further, the geolocalized images can be used by a variety of devices and/or applications including augmented reality devices and/or augmented reality services; navigation devices and/or navigation services; map applications; mapping devices, mapping applications, and/or mapping services; and/or search devices, search applications, and/or search services.

Additionally, due to the improved accuracy of the geolocalized data, the availability of network resources may increase as a result of the reduction in the number of updates that occur due to inaccurate geolocalized images and/or geolocalized data. By improving the accuracy of information associated with the state of a target location, the need to update inaccurate information is reduced and so too the load on communications network resources.

Accordingly, the disclosed technology may assist the user of a map application and/or augmented reality application in more efficiently/effectively performing the technical task of generating target location data for a target location by means of a continued and/or guided human-machine interaction process. In addition, the disclosed technology may provide a computing system that facilitates more effective usage of network resources and computational resources which can in turn improve the effectiveness of a wide variety of services including navigation services and map services. As such, the improvements offered by the disclosed technology can result in tangible benefits to a variety of devices and/or systems including mechanical, electronic, computing systems, and/or computing devices associated with geolocation, mapping, and/or navigation.

With reference now to FIGS. 1-11, example embodiments of the present disclosure will be discussed in further detail. FIG. 1A depicts a diagram of an example system according to example embodiments of the present disclosure. The system 100 includes a computing device 102, a computing system 130, and/or a training computing system 150 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: map data that can include information associated with one or more locations of one or more objects in a geographic area. Further, the map data can include information associated with a target location within an environment of the geographic area. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a user device (e.g., a computing device configured to perform any operations described herein including one or more operations associated with generating information and/or data associated with a target location, generating indications to capture an image of a target location, and interacting with a user via an augmented reality interface), a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 and/or the computing system 130 can be configured to perform one or more operations including: receiving a request for target location data associated with an environment including a target location; accessing, based at least in part on the request, target location data including information associated with a portion of the environment from which the target location is within a field of view of a user device; determining, based at least in part on the target location data, at least one suitable position of the user device from which an unobstructed view of the target location that satisfies one or more criteria is within the field of view of the user device; and generating one or more indications and one or more images of the environment within the field of view of the user device.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-11.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to determine a suitable position for a user device to capture an image of a target location across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., a map service and/or search service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: sensor data and/or map data.

Furthermore, in some embodiments, the computing system 130 can be configured to perform the operations of a server computing device including sending and/or receiving data including target location data associated with a target location and/or map data associated with one or more locations of a geographic area to and/or from one or more computing devices and/or computing systems including the computing device 102, and/or the training computing system 150. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, a user computing device (e.g., a computing system configured to perform any operations described herein including one or more operations associated with receiving a request for target location data; accessing target location data; determining at least one suitable position of the user device from which an unobstructed view of the target location that satisfies one or more criteria is within the field of view of the user device; and generating one or more indications and one or more images of the environment within the field of view of the user device), a personal computing device (e.g., laptop computing device or desktop computing device), a mobile computing device (e.g., smartphone or tablet), a server computing system (e.g., a computing system configured to provide data including sensor data and/or map data), and/or a controller.

Furthermore, the server computing system 130 can be configured to perform image content analysis on one or more inputs (e.g., image data including one or more images) that are provided to the server computing system 130. For example, the server computing system 130 can receive data, via the network 180. The data can include image data that includes one or more images and/or associated metadata (e.g., the location (e.g., latitude, longitude, and/or latitude) at which the image was captured). The server computing system 130 can then perform various operations, which can include the use of the one or more machine-learned models 140, to detect one or more features of the one or more images.

By way of further example, the server computing system 130 can use object recognition techniques to detect the position and/or location of one or more objects in an image (e.g., objects that can obstruct the field of view of a camera) based at least in part on recognition of the one or more objects. In another example, the server computing system 130 can receive data from one or more remote computing systems (e.g., the computing device 102) which can include images that have been associated with metadata. The data received by the server computing system 130 can then be stored (e.g., stored in an image repository) for later use by the computing system 130.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-11.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include sensor data and/or map data. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any sensor data and/or map data. For example, the training data can include a plurality of images of objects. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including determining, based at least in part on the target location data, at least one suitable position of the user device from which an unobstructed view of the target location that satisfies one or more criteria is within the field of view of the user device.

In some embodiments, the model trainer 160 can perform one or more operations which can include adjusting, at each of a plurality of training iterations, one or more parameters or weights of the one or more machine-learned models 120 to minimize the one or more differences between a captured image of a target location and a ground-truth image of a target location from a suitable position. For example, the model trainer 160 can perform one or more operations including using a loss function to compare the one or more differences between the captured training image of a target location and a ground-truth image of a target location from a suitable position. By way of further example, greater differences between the captured training image of a target location and a ground-truth image of a target location from a suitable position can result in a greater adjustment of the one or more parameters or weights of the one or more machine-learned models 120. Further, the model trainer 160 can use a plurality of images that can include one or more images of actual environments captured from various angles, distances, and in various lighting conditions. The model trainer 160 can also use a plurality of computer-generated images that simulate images captured from various angles, distances, and in various lighting conditions.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates an example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is of higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
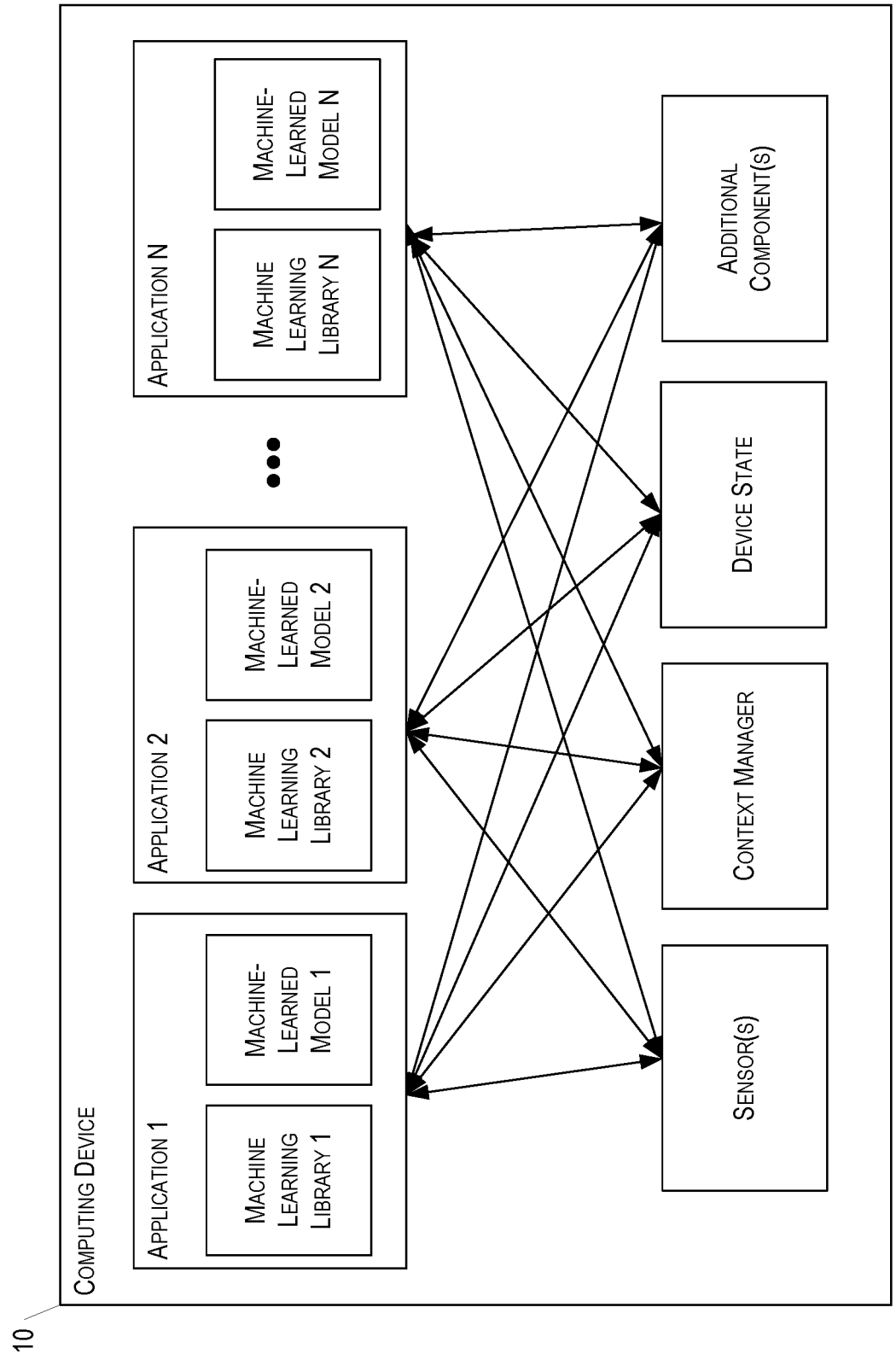
FIG. 1B depicts a block diagram of an example computing device that performs operations associated with augmented reality based generation of geolocalized images according to example embodiments of the present disclosure.
Figure 2:
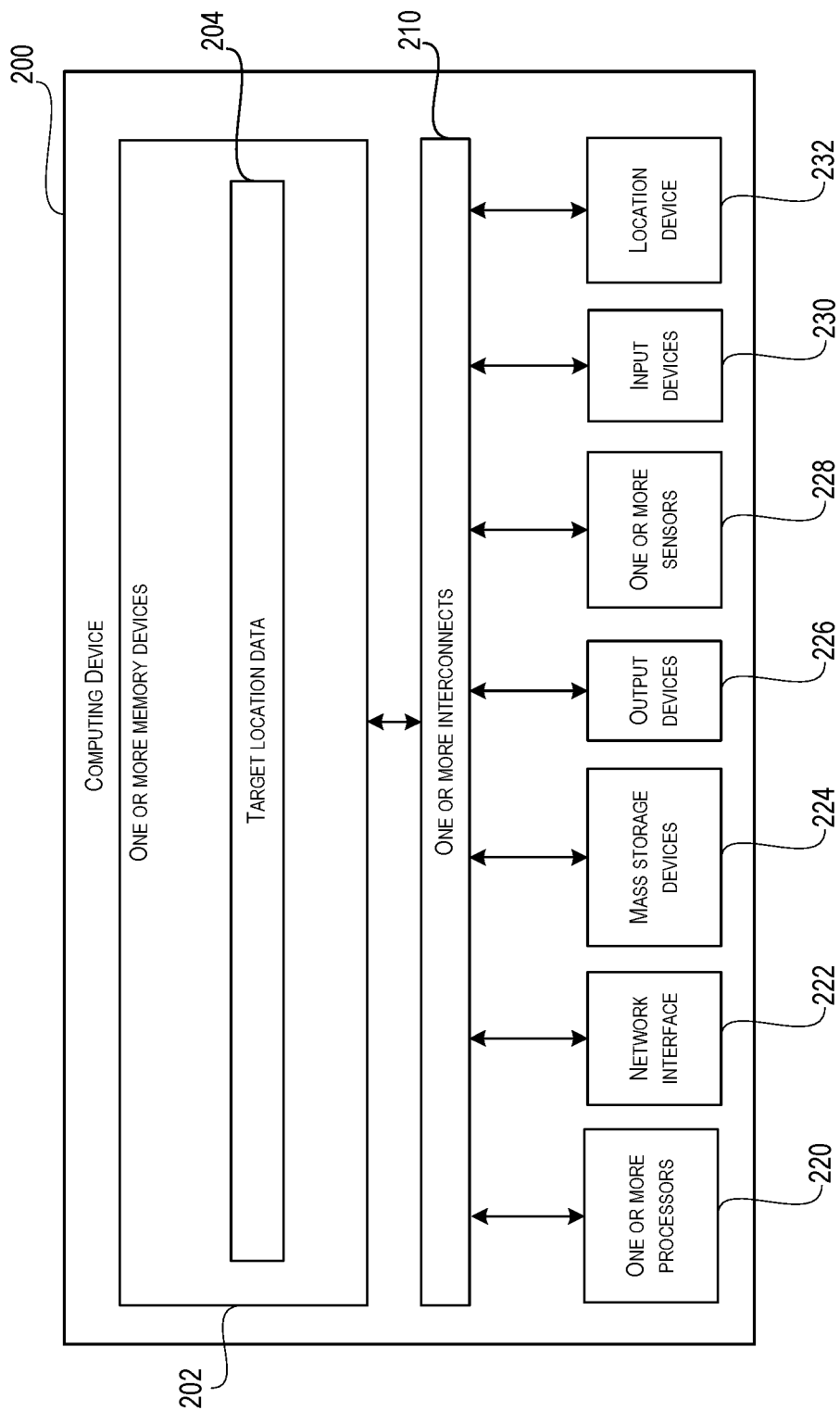
FIG. 2 depicts a diagram of an example device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a map application, an augmented reality application, a navigation application, text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
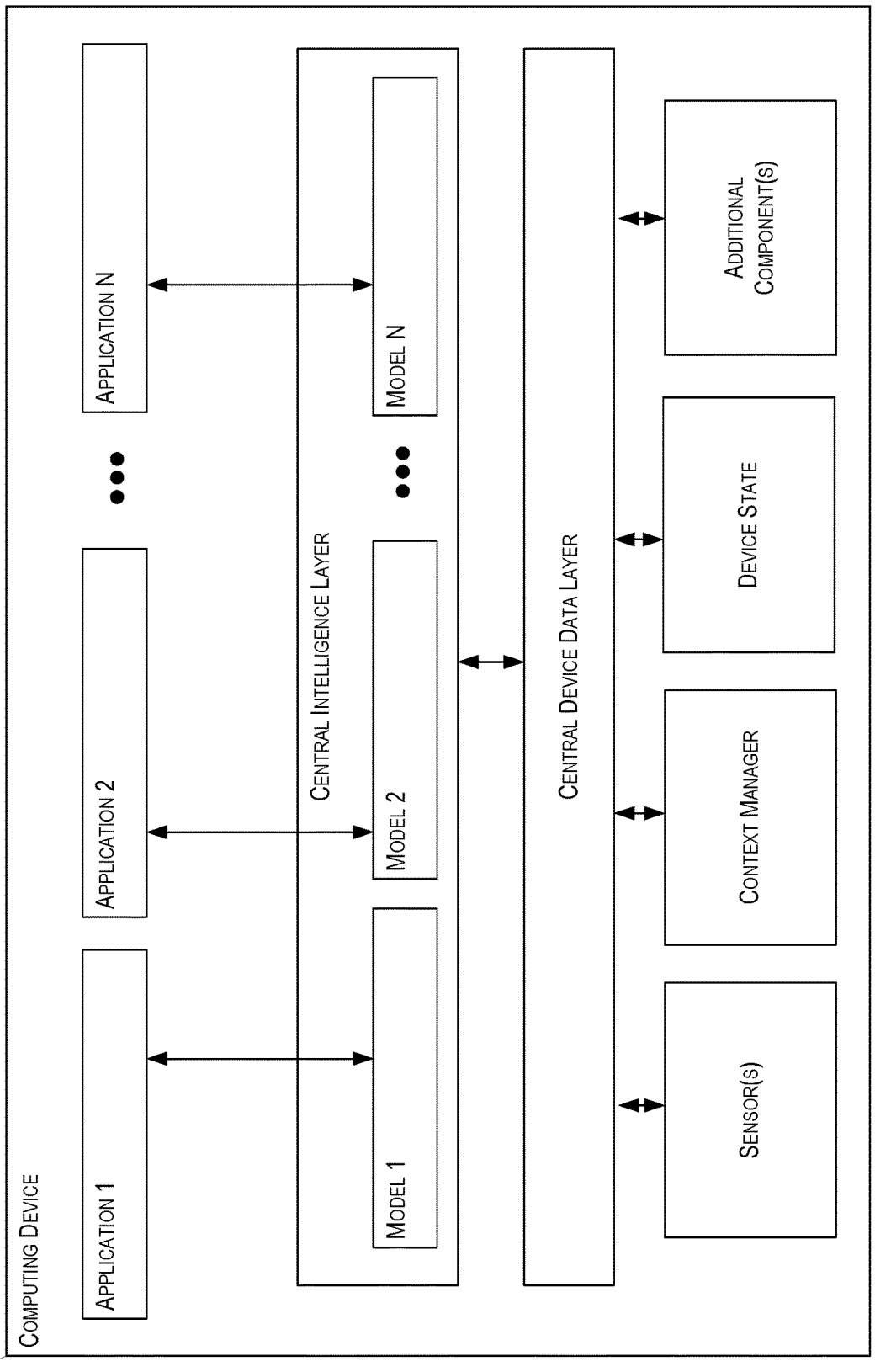
FIG. 1C depicts a block diagram of an example computing device that performs operations associated with augmented reality based generation of geolocalized images according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a map application, an augmented reality application, a navigation application, a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 1D:
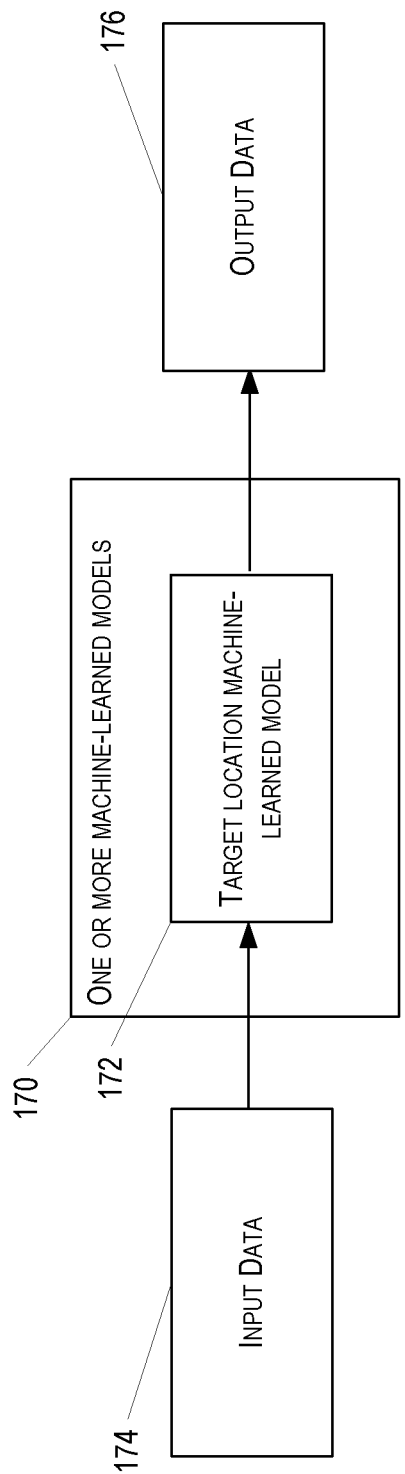
FIG. 1D depicts a block diagram of an example of one or more machine-learned models according to example embodiments of the present disclosure.

FIG. 1D depicts a block diagram of an example of one or more machine-learned models 170 according to example embodiments of the present disclosure. In some implementations, the one or more machine-learned models 170 are trained to receive a set of input data 174 descriptive of an image (e.g., an image of an environment including a target location that is captured by a camera of a user computing device) and, after performing one or more operations on the input data 174, generating output data 176 that includes one or more indications regarding the location of a target location and/or an indication of when a user computing device is in a suitable position from which an unobstructed view of the target location that satisfies one or more criteria (e.g., the camera angle frames the entire target location). Thus, in some implementations, the one or more machine-learned models 170 can include a target location machine-learned model 172 that is operable to generate output associated with detection of a target location and determination of a suitable position for a user computing device.

FIG. 2 depicts a diagram of an example device according to example embodiments of the present disclosure. A computing device 200 can include one or more attributes and/or capabilities of the computing device 102, the computing system 130, and/or the training computing system 150. Furthermore, the computing device 200 can perform one or more actions and/or operations including the one or more actions and/or operations performed by the computing device 102, the computing system 130, and/or the training computing system 150, which are depicted in FIG. 1A.

As shown in FIG. 2, the computing device 200 can include one or more memory devices 202, target location data 204, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the target location data 204). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The target location data 204 can include one or more portions of the data 116, the data 136, and/or the data 156 depicted in FIG. 1A and/or instructions (e.g., the instructions 118, the instructions 138, and/or the instructions 158 which are depicted in FIG. 1A) that are stored in the memory 114, the memory 134, and/or the memory 154, respectively. Furthermore, the target location data 204 can include information associated with a target location that is located within an environment. Furthermore, the target location data 204 can also include information associated with the state of the target location and/or one or more objects within a predetermined distance of the target location. In some embodiments, the target location data 204 can be received from one or more computing systems (e.g., the computing system 130 that is depicted in FIG. 1A).

The one or more interconnects 210 can include one or more interconnects or buses that can be used to send and/or receive one or more signals (e.g., electronic signals) and/or data (e.g., the target location data 204) between components of the computing device 200, including the one or more memory devices 202, the one or more processors 220, the network interface 222, the one or more mass storage devices 224, the one or more output devices 226, the one or more sensors 228 (e.g., a sensor array that can include one or more cameras, one or more radar devices, one or more sonar devices, and/or one or more LiDAR devices), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the target location data 204. Further, the computing device 200 can be configured to perform one or more operations including: receiving a request for target location data associated with an environment including a target location; accessing, based at least in part on the request, target location data including information associated with a portion of the environment from which the target location is within a field of view of a user device; determining, based at least in part on the target location data, at least one suitable position of the user device from which an unobstructed view of the target location that satisfies one or more criteria is within the field of view of the user device; and generating one or more indications and one or more images of the environment within the field of view of the user device. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the target location data 204.

The one or more output devices 226 can include one or more display devices (e.g., LCD display, OLED display, and/or CRT display), one or more light sources (e.g., LEDs), one or more loudspeakers, and/or one or more haptic output devices. In some embodiments, the computing device 200 can include and/or be associated with one or more augmented reality devices including one or more augmented reality headsets and/or augmented reality eyewear. For example, the one or more output devices 226 can include augmented reality eyewear (AR glasses) that can include display images on a display that integrated with the lens portion of the augmented reality eyewear so that a wearer of the augmented reality eyewear can view images generated by the computing device 200 when looking through the lenses of the augmented reality eyewear.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associated with the system 100 shown in FIG. 1A. Further, the software applications that can be operated and/or executed by the computing device 200 can include native applications and/or web-based applications.

The location device 232 can include one or more devices or circuitry for determining the position and/or location of the computing device 200. For example, the location device 232 can determine an actual (e.g., a latitude, longitude, and/or altitude) and/or relative (e.g., a position of the computing device 200 relative to some point of reference with a previously determined location and/or position) location and/or position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position. Further, the location device 232 can include: one or more gyroscopes that can be used to determine a yaw, pitch, and/or roll of the computing device; and/or one or more accelerometers that can be used to measure the acceleration of the computing device 200.

Figure 3:
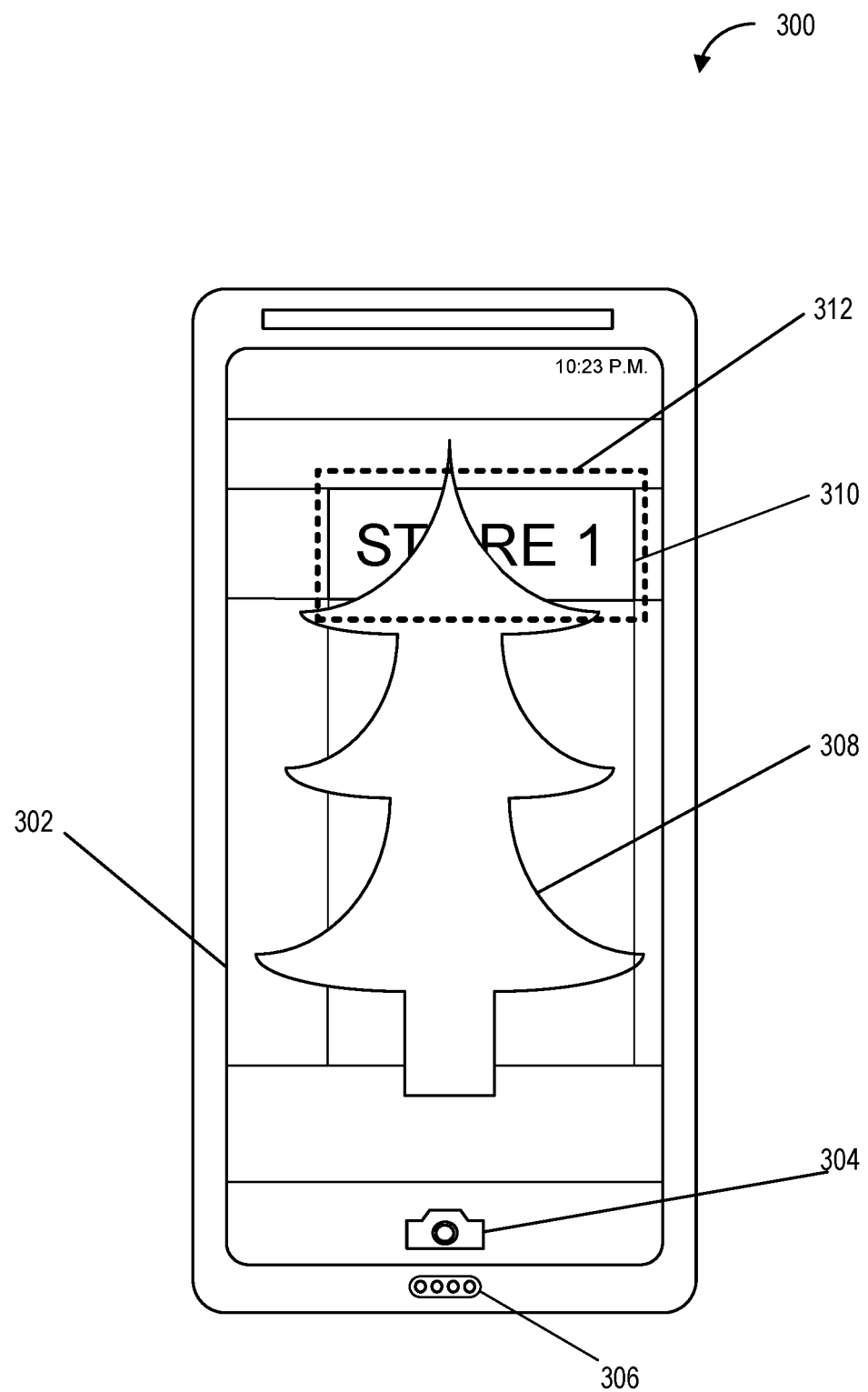
FIG. 3 depicts an example of augmented reality based generation of geolocalized images according to example embodiments of the present disclosure.

FIG. 3 depicts an example of augmented reality based generation of geolocalized images according to example embodiments of the present disclosure. Any operations and/or actions associated with the user computing device 300 can be performed by a computing device and/or computing system that includes one or more attributes and/or capabilities of the computing device 102, the computing system 130, the training computing system 150, and/or the computing device 200. As shown in FIG. 3, the user computing device 300 includes a display component 302, an interface element 304, an audio component 306, a tree object 308, a sign object 310, and an indication 312.

The user computing device 300 can be configured to receive and/or send data and/or information including target location data and/or any data associated with determining the state of a target location. For example, the user computing device 300 can be implemented as a personal computing device (e.g., a smartphone or an augmented reality headset) that can perform one or more operations on various types of data including target location data. Further, the user computing device 300 can include one or more machine-learned models that can be configured to detect, identify, and/or recognize one or more objects in an environment. Additionally, the one or more machine-learned models of the user computing device 300 can be configured and/or trained to determine the distance and/or orientation one or more objects relative to the user computing device 300. Based on the position of the user computing device 300 relative to a target location (e.g., the front door of a store that includes hours of operation posted on the door), the one or more machine-learned models can generate one or more indications regarding whether the position of the user computing device 300 is a suitable position with an unobstructed view of a target location that satisfies one or more criteria (e.g., the target location is sufficiently close to the user computing device 300).

As shown, the user computing device 300 includes a display component 302 that can display various images including one or more indications, text, one or more pictures, and/or one or more graphics (e.g., a graphical user interface). Further, the display component 302 can display one or more images captured by a camera component (not shown) of the user computing device 300. For example, the camera component of the user computing device 300 can capture one or more images of an environment in the field of view of the camera component of the user computing device 300. Further display component 302 can display one or more indications that indicate where a target location is and/or instructions or graphical elements associated with positioning the user computing device 300 in a suitable position. For example, the display component 302 can display a textual indication "PLEASE PLACE THE SIGN INSIDE THE RECTANGLE" to indicate that the user should move the user computing device until the sign is inside the rectangle.

Additionally, the display component 302 can be configured to detect interactions (e.g., user interactions) with the display component 302. For example, the display component 302 can detect interactions using one or more sensors including one or more capacitive sensors, one or more resistive sensors, one or more light sensors, one or more pressure sensors, and/or one or more acoustic sensors. By way of further example, the display component 302 can include a touch sensitive display that can detect one or more touches by a user of the user computing device 300. A user can for example, interact with the interface element 304 (e.g., an icon of a camera) that is configured to activate a camera that can capture the image that is displayed on the display component 302.

Further, the user computing device 300 can include an audio component 306 that can be configured to output one or more sounds including one or more auditory indications that can provide instructions to a user of the user computing device 300. For example, the user computing device 300 can generate auditory output announcing "PLEASE PLACE THE SIGN INSIDE THE RECTANGLE" to indicate that the user of the user computing device 300 should move the user computing device so that the sign object 310 for the store is within the indication 312 (e.g., the rectangle).

In this example, the portion of an environment that is displayed on the display component 302 includes a plurality of objects including the tree object 308 that is obstructing the view of the sign object 310 in which the letters "S," "T," "R," and "E" are visible. The user computing device 300 can use one or more machine-learned models to generate one or more object classifications of the objects depicted in the image of the environment. The user computing device 300 can then determine that the store sign identifies the store and generates an indication 312 that can guide the user that is capturing an image of the store. By generating the indication 312, the user computing device 300 provides an improved human-machine interface that facilitates guidance of a user when the user seeks to capture an image containing the information associated with the sign object 310 (e.g., information that may be essential to determining the identity of the sign object 310).

Figure 4:
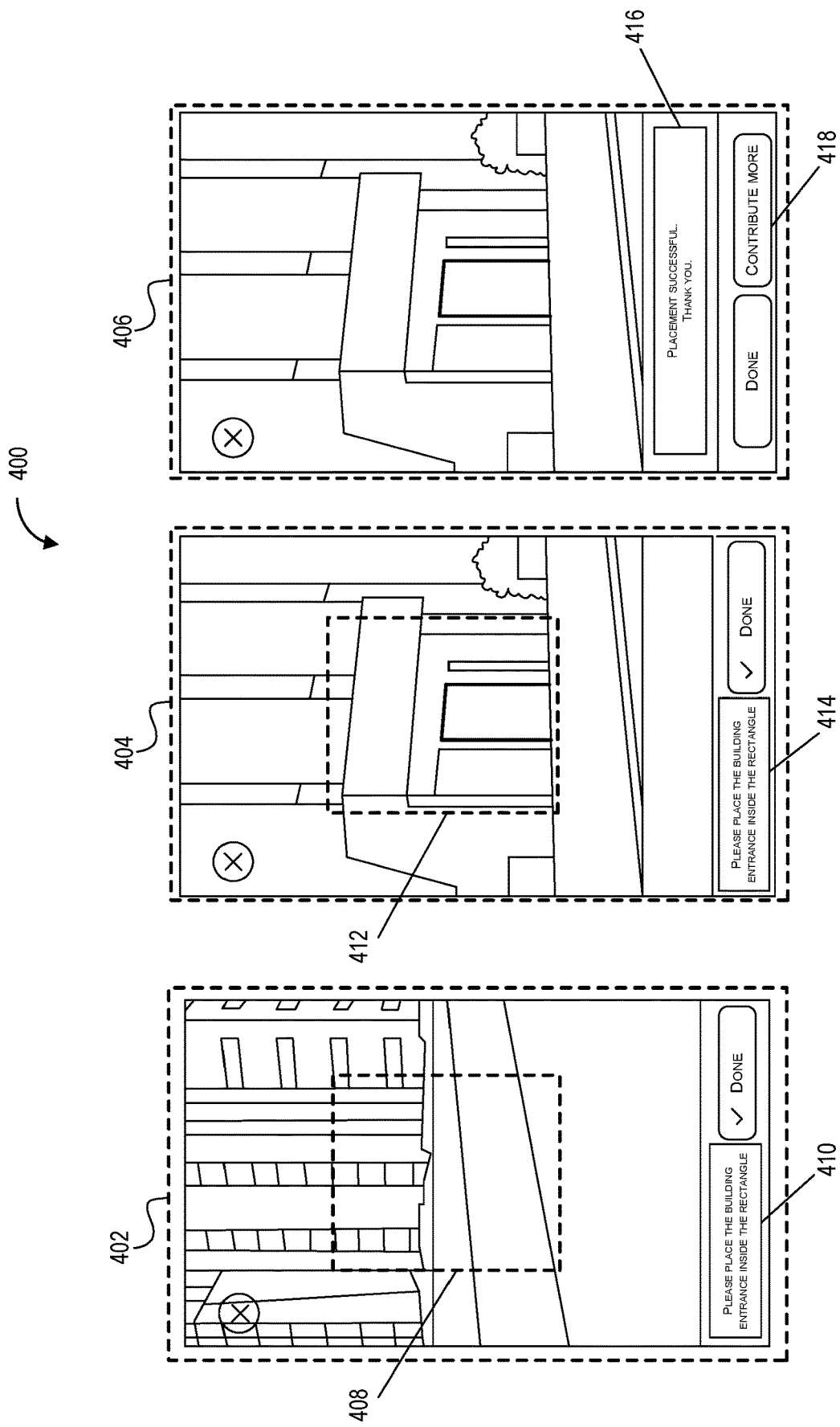
FIG. 4 depicts an example of augmented reality based generation of geolocalized images according to example embodiments of the present disclosure.

FIG. 4 depicts an example of augmented reality based generation of geolocalized images according to example embodiments of the present disclosure. Any operations and/or actions associated with a user computing device output 400 can be performed by a computing device and/or computing system that includes one or more attributes and/or capabilities of the computing device 102, the computing system 130, the training computing system 150, and/or the computing device 200. As shown in FIG. 4, the user computing device output 400 includes a user computing device output 402, a user computing device output 404, a user computing device output 406, an indication 408, an indication 410, an indication 412, an indication 414, an indication 416, and an indication 418.

As shown in FIG. 4, the user computing device output 402 is the output from a user computing device (e.g., the computing device 200) that is displayed on a display component of the user computing device. In this example, the user computing device output 402 includes an image of an environment that includes a target location (e.g., an entrance to a building) that is within a field of view of a camera of the user computing device. The user computing device output 402 also includes the indication 408, which is a rectangular indication. Further, the indication 410 is an indication to "PLEASE PLACE THE BUILDING ENTRANCE INSIDE THE RECTANGLE" that directs a user of the user computing device to maneuver the user computing device until the building entrance is within the indication 408 (e.g., the rectangle).

The user computing device output 404 is the output from a user computing device (e.g., the computing device 200) that is displayed on a display component of the user computing device. The user computing device output 404 is generated subsequent to the user computing device output 404. Further, the user computing device output 404 includes a magnified image of an environment that was depicted in the user computing device output 402. In the user computing device output 404, the target location (e.g., the entrance to the building) is within a field of view of a camera of the user computing device and within the indication 412. The user computing device output 404 also includes the indication 414, which is the same as the indication 410, and indicates "PLEASE PLACE THE BUILDING ENTRANCE INSIDE THE RECTANGLE" directing the user of the user computing device to maneuver the user computing device until the building entrance is within the indication 412 (e.g., the rectangle).

The user computing device output 400 can indicate when the target location is within the field of view of the user computing device. For example, a user computing device can use one or more machine-learned models that are configured and/or trained to detect one or more features of images displayed by the user computing device. Further, the one or more machine-learned models can be configured and/or trained to determine when certain features (e.g., the entrance of a building) are within the field of view of the user computing device. In this example, the user computing device output 406 includes the indication 416 which states "PLACEMENT SUCCESSFUL. THANK YOU" which indicates to the user that the image of the target location has been captured. When the image of the target location has been captured, the user computing device 400 can generate the indication 418, which can indicated to the user that an additional image of a target location can be captured.

In some embodiments, the user computing device can be configured to provide one or more indications (e.g., instructions and visual indications) to a user. The one or more indications can include directional arrows (e.g., up, down, left, right, forward, and/or backwards) indicating a direction the user should position the user computing device, shapes (e.g., polygons or circles that can surround a target location), and/or text instructing the user the position the user computing device in a particular way.

Figure 5:
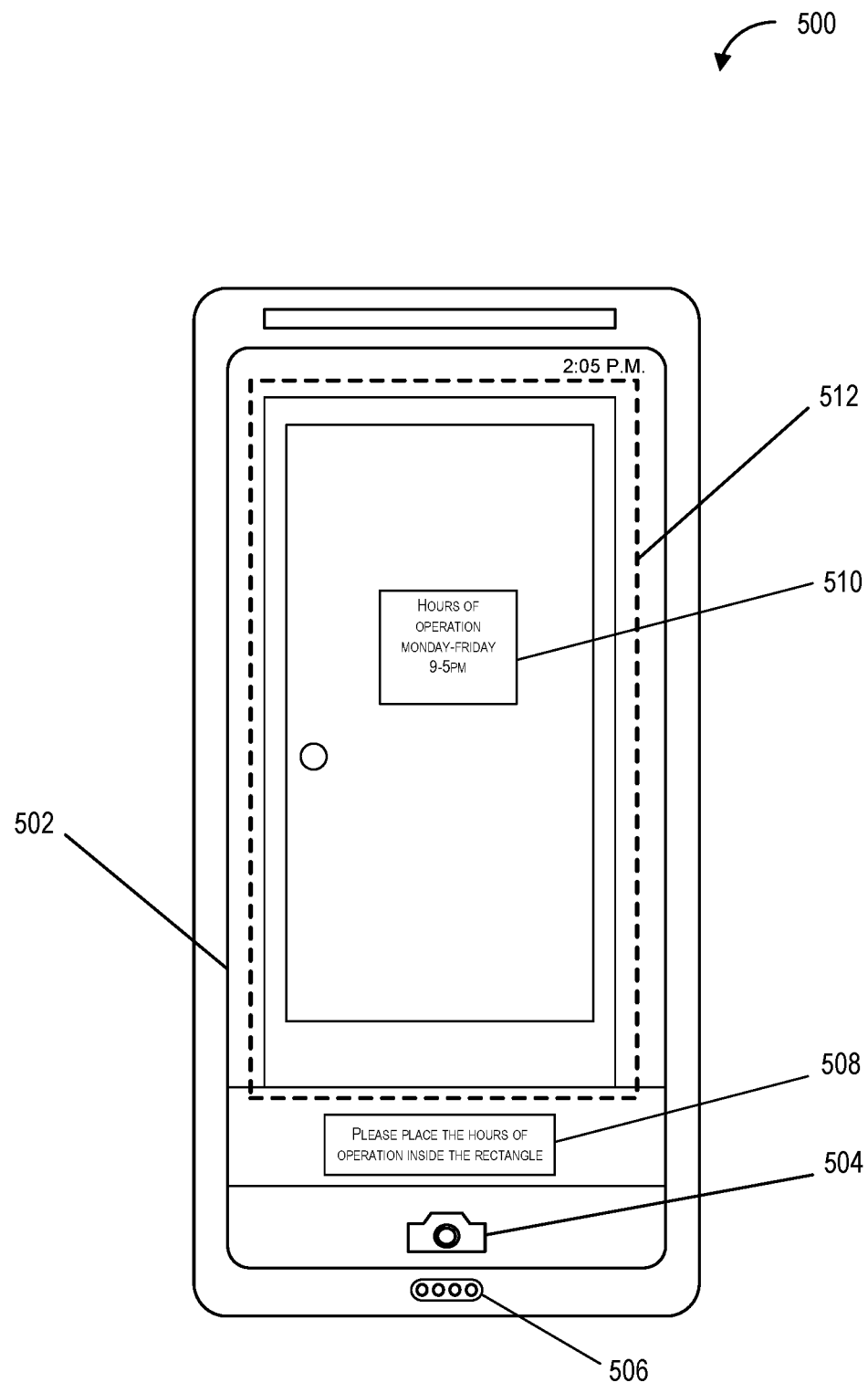
FIG. 5 depicts an example of augmented reality based generation of geolocalized images according to example embodiments of the present disclosure.

FIG. 5 depicts an example of augmented reality based generation of geolocalized images according to example embodiments of the present disclosure. Any operations and/or actions associated with the user device 500 can be performed by a computing device and/or computing system that includes one or more attributes and/or capabilities of the computing device 102, the computing system 130, the training computing system 150, and/or the computing device 200. As shown in FIG. 5, the user computing device 500 includes a display component 502, an interface element 504, an audio component 506, an indication 508, a hours of operation object 510, and an indication 512.

The user computing device 500 can be configured to receive and/or send data and/or information including target location data and/or any data associated with determining the state of a target location. For example, the user computing device 500 can be implemented as a personal computing device (e.g., a smartphone or augmented reality eyewear) that can perform one or more operations on various types of data including target location data. Further, the user computing device 500 can include one or more machine-learned models that can be configured to detect, identify, and/or recognize one or more objects in an environment including text that is visible in the environment. Additionally, the one or more machine-learned models of the user computing device 500 can be configured and/or trained to determine the distance and/or orientation one or more objects relative to the user computing device 500. Based on the position of the user computing device 500 relative to a target location, the one or more machine-learned models can generate one or more indications regarding whether the position of the user computing device 500 is a suitable position with an unobstructed view of a target location that satisfies one or more criteria (e.g., the target location is sufficiently close to the user computing device 500).

As shown, the user computing device 500 includes a display component 502 that can display various images including one or more indications, text, one or more pictures, and/or one or more graphics (e.g., a graphical user interface). Further, the display component 502 can display one or more images captured by a camera component (not shown) of the user computing device 500. For example, the camera component of the user computing device 500 can capture one or more images of an environment in the field of view of the camera component of the user computing device 500. Further display component 502 can display one or more indications that indicate where a target location is and/or instructions or graphical elements associated with positioning the user computing device 500 in a suitable position. In this example, the user computing device 500 has generated the indication 508 which prompts the user to "PLEASE PLACE THE HOURS OF OPERATION INSIDE THE RECTANGLE." In some embodiments, the user computing device 500 can prompt the user to place other objects, including the door object 508, inside the indication 512 or some other indication.

Additionally, the display component 502 can be configured to detect interactions (e.g., user interactions) with the display component 502. For example, the display component 502 can detect interactions using one or more sensors including one or more capacitive sensors, one or more resistive sensors, one or more light sensors, one or more pressure sensors, and/or one or more acoustic sensors. By way of further example, the display component 502 can include a touch sensitive display that can detect one or more touches by a user of the user computing device 500. A user can for example, interact with the interface element 504 (e.g., an icon of a camera) that is configured to activate a camera that can capture the image that is displayed on the display component 502.

Further, the user computing device 500 can include an audio component 506 that can be configured to output one or more sounds including one or more auditory indications that can provide instructions to a user of the user computing device 500. For example, the user computing device 500 can generate auditory output announcing "PLEASE PLACE THE HOURS OF OPERATION INSIDE THE RECTANGLE" to indicate that the user of the user computing device 500 should move the user computing device so that the hours of operation object 510 on the door is within the indication 512 (e.g., the rectangle).

Figure 6:
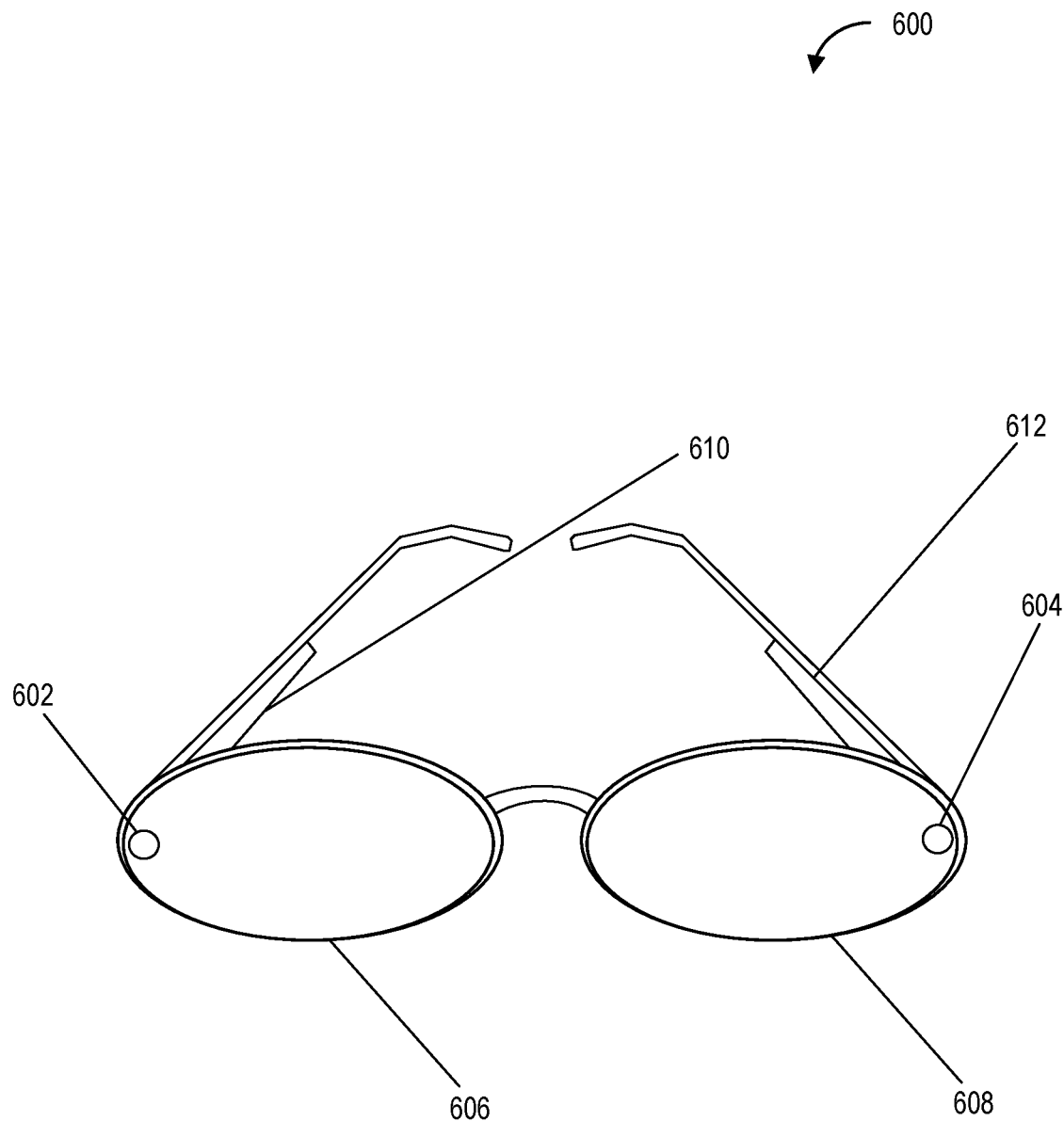
FIG. 6 depicts an example of augmented reality based generation of geolocalized images according to example embodiments of the present disclosure.

FIG. 6 depicts an example of an augmented reality device according to example embodiments of the present disclosure. Any operations and/or actions associated with an augmented reality device 600 can be performed by a computing device and/or computing system that includes one or more attributes and/or capabilities of the computing device 102, the computing system 130, the training computing system 150, and/or the computing device 200. As shown in FIG. 6, the augmented reality device 600 includes a camera 602, a LiDAR device 604, a lens display 606, a lens display 608, a computing system 610, and a location system 612.

As shown in FIG. 6, the augmented reality device 600 is a device that can be worn by a user in the manner of glasses. The augmented reality device 600 includes the camera 602, which can capture one or more images of an environment. For example, the camera 302 can capture one or more images of a target location (e.g., a storefront) that will be associated with the geographic location of the target location and added to a database that includes target location data.

The lens display 606 and the lens display 608 are transparent or semi-transparent material (e.g., a glass and/or polycarbonate material) through which a user can view the surrounding environment. Further, the lens display 606 and/or the lens display 608 can be configured to display one or more images that are projected onto the lens display 606 and/or the lens display 608 or generated on a transparent or semi-transparent display layer that is on the surface of the lens display 606 and/or the lens display 608 or embedded in the lens display 606 and/or the lens display 608.

Any combination of the lens display 606 and the lens display 608 can be configured to display one or more images that can be perceived by a user (e.g., a person wearing the augmented reality device 600) of the augmented reality device 600 as being superimposed on the environment that is visible through the lens display 606 and the lens display 608. For example, the lens display 606 and the lens display 608 can generate one or more indications that can be used to guide a user in capturing one or more images of an environment in the field of view of the camera 602.

The LiDAR device 604 can be configured to detect the environment around the LiDAR device 604 and send a plurality of LiDAR returns to the augmented reality device 600 which can use the plurality of LiDAR returns to generate a three-dimensional model of that environment. The LiDAR device 604 can be used as part of determining the location, orientation, position, and/or size of one or more objects detected by the LiDAR device 604. For example, the LiDAR device 604 can generate a plurality of LiDAR returns that are sent to the computing system 610, which can process the plurality of LiDAR returns and generate a three-dimensional model of the environment detected by the LiDAR device 604. The LiDAR device 604 can accurately determine the location of one or more objects relative to the augmented reality device 600. In some embodiments, the LiDAR device 604 can be used to detect one or more objects that can be used as one or more anchor cues (e.g., world anchored cues) respectively. For example, the LiDAR device 604 can detect a lamp-post with a known geographic location. The location of the lamp-post can then be used as a point of reference from which one or more locations and/or one or more orientations of one or more objects in an environment can be accurately determined.

Further, the augmented reality device 600 can include a location system 612, which can be configured to determine the location (e.g., latitude, longitude, and/or altitude) of the augmented reality device 600. For example, the location system 612 can receive GPS signals that can be used to determine the location of the augmented reality device 600.

Figure 7:
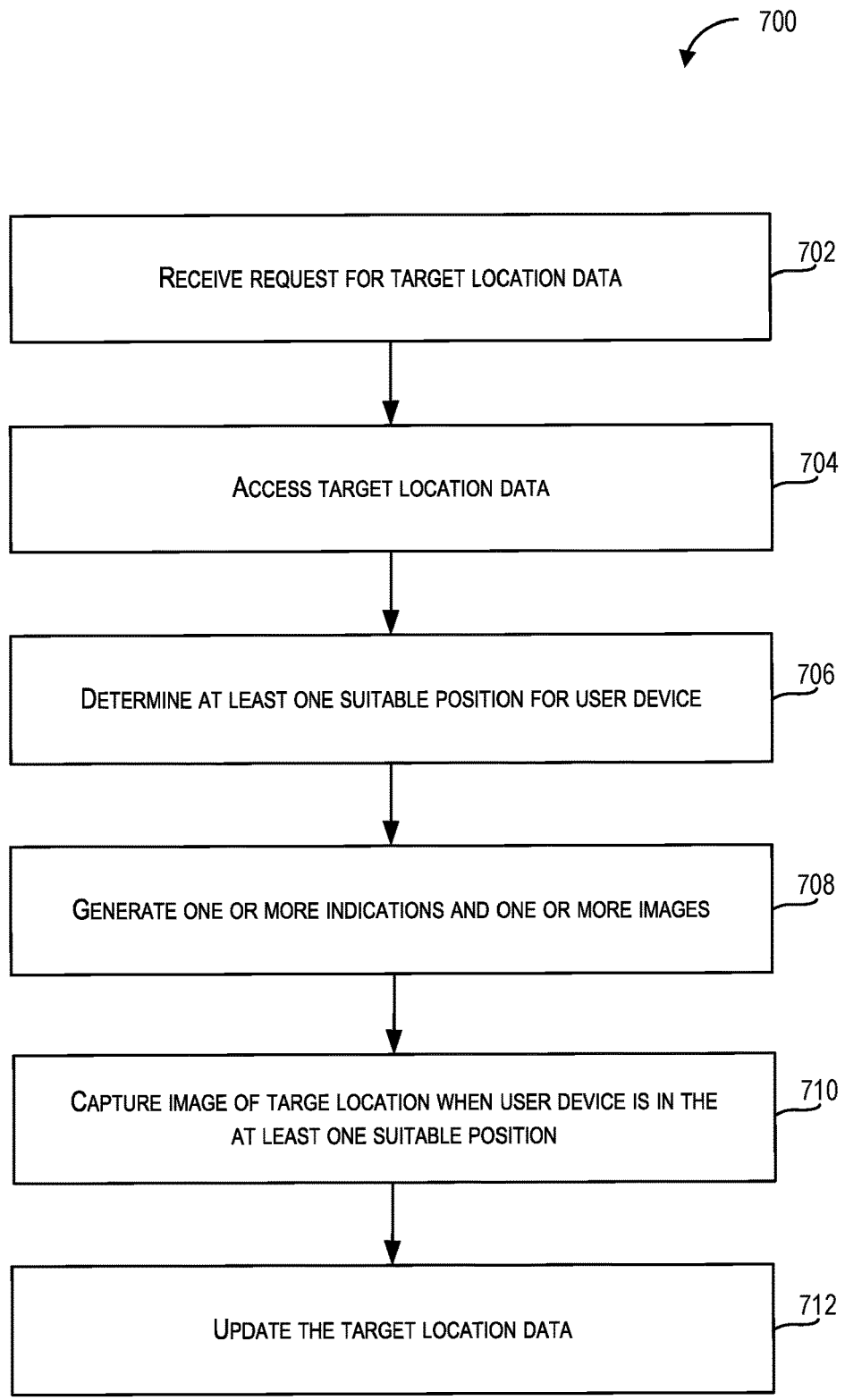
FIG. 7 depicts a flow diagram of augmented reality based generation of geolocalized images according to example embodiments of the present disclosure.

FIG. 7 depicts a flow diagram of augmented reality based generation of geolocalized images according to example embodiments of the present disclosure. One or more portions of the method 700 can be executed and/or implemented on one or more computing devices or computing systems including, for example, the computing device 102, the computing system 130, the training computing system 150, and/or the computing device 200. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include receiving a request for target location data. The target location data can be associated with an environment comprising a target location. For example, the computing device 102 can receive a request for target location data from one or more remote computing devices that are associated with a map service, search service, and/or navigation service that are operated via one or more respective map applications (e.g., an application used to determine or view a geographic location), one or more search applications (e.g., a search engine in an Internet browser), and/or one or navigation applications (e.g., an application used to generate routes between different geographic locations).

At 704, the method 700 can include accessing target location data. The target location data can include information associated with an environment from which a target location is within a field of view of a user device. Accessing the target location data can be based at least in part on the request for the target location data.

For example, the computing device 102 can access target location data that includes information associated with the location of the target location (e.g., a latitude, longitude, and/or latitude of the target location), a name of a target location, a type of target location (e.g., a restaurant, a bank, and/or a store), and/or hours of operation of the target location. Further, the target location data can include information associated with one or more locations of one or more objects at the target location. By way of example, the one or more objects can include one or more roads, one or more streets, and/or one or more buildings in the geographic area.

At 706, the method 700 can include determining, based at least in part on the target location data, at least one suitable position of the user device from which an unobstructed view of the target location is within the field of view of the user device and from which the unobstructed view of the target location satisfies one or more criteria. For example, the target location data can include one or more locations of one or more objects and the computing device 102 can determine a suitable position from which the target location is not obstructed by the one or more objects and a viewing angle of the target location from the computing device 102 that allows the computing device 102 to capture an image that includes the entirety of the target location. By making such a determination, a suitable position for the user device can be automatically determined without requiring any user input or consideration with respect to where the user device should be positioned to place it in a suitable position.

At 708, the method 700 can include generating one or more indications and one or more images of the environment within the field of view of the user device. The one or more indications can be associated with positioning the user device in the at least one suitable position. For example, the computing device 102 can generate one or more indications including a green rectangle around the perimeter of the target location that is within the field of view of a camera of the computing device 102. The green rectangle around the target location can be displayed on a display portion of the computing device 102 and can be displayed in a bright green that surrounds an image of the target location. In some embodiments, the one or more indications can include one or more symbols including arrows or other indicators of a direction in which the user device should be positioned. Through the use of indications in this manner, an improved man-machine interface can be provided, which can result in an objectively higher quality image of a target location that may be captured by a user without requiring consideration by the user.

At 710, the method 700 can include capturing, by the user device, an image of the target location when the user device is in the at least one suitable position. For example, user device 102 can include a camera that is configured to capture an image of the target location. Further, the computing device 102 can be configured to determine when the user device is in the at least one suitable position.

By way of further example, the computing device 102 can include one or more machine-learned models that are configured and/or trained to detect and/or classify visual features of the target location (e.g., a sign with the name of a business at the target location) and capture an image of the target location when one or more criteria are satisfied (e.g., satisfying the one or more criteria can include the entire target location being within the field of view of the computing device 102). In this way, the quality of the image that is captured may be of sufficiently high without requiring consideration by a user.

At 712, the method 700 can include updating, by the user device, the target location data based at least in part on the image of the target location when the user device is in the at least one suitable position. For example, the computing device 102 can update the target location data based at least in part on the image of the target location that was captured when the user device was in the at least one suitable position. The target location data can be updated without having to resort to manual inspection by a human due to the high quality of captured images of a target location from a suitable position of the user device that is captured using objective analysis to meet objective criteria.

Figure 8:
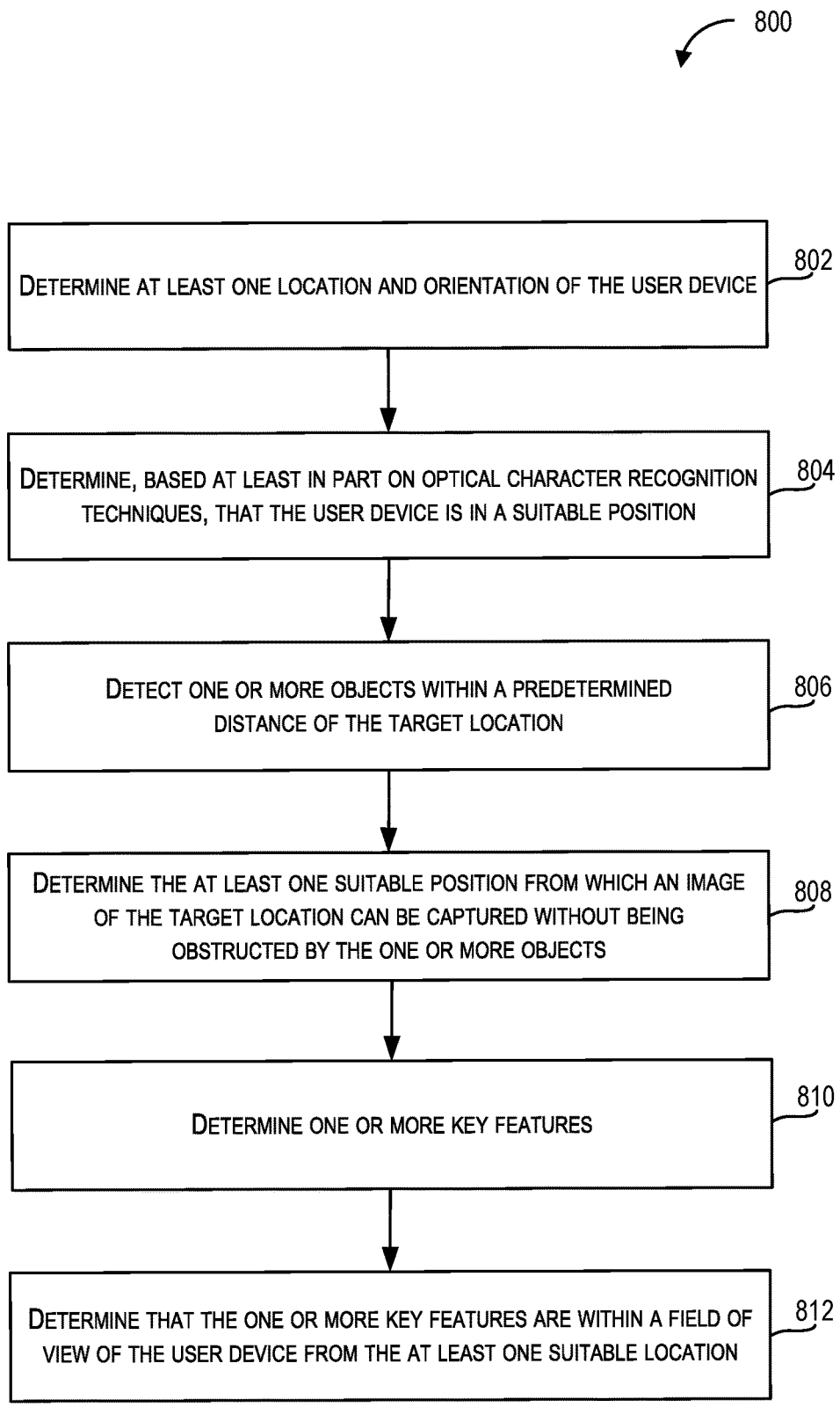
FIG. 8 depicts a flow diagram of augmented reality based generation of geolocalized images according to example embodiments of the present disclosure.

FIG. 8 depicts a flow diagram of augmented reality based generation of geolocalized images according to example embodiments of the present disclosure. One or more portions of the method 800 can be executed and/or implemented on one or more computing devices or computing systems including, for example, the computing device 102, the computing system 130, the training computing system 150, and/or the computing device 200. Further, one or more portions of the method 800 can be executed or implemented as an algorithm on the hardware devices or systems disclosed herein. In some embodiments, one or more portions of the method 800 can be performed as part of the method 700 that is depicted in FIG. 7. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining, based at least in part on the target location data, at least one location and/or orientation of the user device relative to the target location from which an unobstructed view of the target location is within the field of view of the user device. For example, the computing device 102 can use the target location data to determine one or more locations of one or more objects that can obstruct the view of the target location. Further, the computing device 102 can determine at least one location and orientation of the computing device 102 from which the one or more objects do not obstruct the field of view of the computing device 102. By automatically making a determination of the location and orientation of the user device required for an unobstructed view, user input or consideration of where a suitable location and orientation might be to capture a suitable image is not required.

At 804, the method 800 can include determining, based at least in part on application of one or more optical character recognition techniques, that the user device is in a suitable position when an unobstructed view of one or more portions of predetermined text is located within a predetermined distance of the target location is within the field of view of the user device. For example, the computing device 102 can perform one or more optical character recognition techniques on one or more images of the environment that is in the field of view of a camera of the computing device 102. The one or more optical character recognition techniques can be used to determine when predetermined text (e.g., the name of a business that is supposed to be located at the target location) that is within a predetermined distance of the target location (e.g., within two (2) meters of the target location) is detected.

At 806, the method 800 can include detecting one or more objects within a predetermined distance of the target location. For example, the computing device 102 can access the target location data and determine one or more locations of one or more objects within a twenty-five (25) meter radius of the target location.

In some embodiments, detecting the one or more objects may include the use of one or more machine-learned models that are configured and/or trained to detect and/or identify one or more objects. For example, the computing device 102 can use the one or more machine-learned models (which can be stored locally on the computing device 102) to determine the location, size, and/or shape of one or more objects in the environment around the computing device 102.

At 808, the method 800 can include determining the at least one suitable position of the user device from which an image of the target location can be captured without being obstructed by the one or more objects. The computing device 102 can use the one or more locations of the one or more objects to determine a position from which an unobstructed view of the target location is within a field of view of the computing device 102. For example, an unobstructed view can include a view from which the entirety of a façade of the target location is within the field of view of the computing device 102. By automatically making a determination of the at least one suitable position of the user device from which an image of the target location can be captured without being obstructed by the one or more objects, user input or consideration of where a suitable location and orientation might be to capture a suitable image is not required.

At 810, the method 800 can include determining, based at least in part on one or more machine-learned models, when one or more key features are within the field of view (e.g., visible within the field of view) of the user device. For example, the computing device 102 can include one or more machine-learned models that are configured and/or trained to detect one or more key features including signage indicating the hours of operation of a business associated with a target location.

At 812, the method 800 can include determining that the one or more key features are within a field of view of the user device from the at least one suitable location. For example, when the one or more key features including the hours of operation of a business are detected, the computing device 102 can determine that the computing device 102 is positioned at the at least one suitable location from which an unobstructed view of the target location is within the field of view of the computing device 102.

Figure 9:
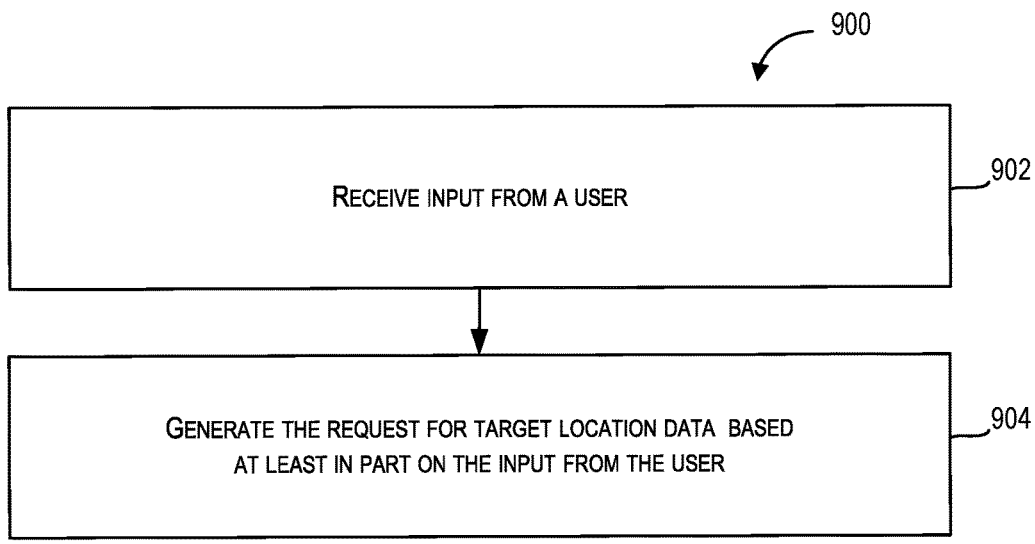
FIG. 9 depicts a flow diagram of augmented reality based generation of geolocalized images according to example embodiments of the present disclosure.

FIG. 9 depicts a flow diagram of augmented reality based generation of geolocalized images according to example embodiments of the present disclosure. One or more portions of the method 900 can be executed and/or implemented on one or more computing devices or computing systems including, for example, the computing device 102, the computing system 130, the training computing system 150, and/or the computing device 200. Further, one or more portions of the method 900 can be executed or implemented as an algorithm on the hardware devices or systems disclosed herein. In some embodiments, one or more portions of the method 900 can be performed as part of the method 700 that is depicted in FIG. 7. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include receiving an input from a user. The input can be associated with one or more interactions by the user with a search for the target location via a map application and/or a search application. For example, the computing device 102 can receive a touch input from a user via a touch screen display that includes a graphical user interface that is used to display a map application and/or a search application. to select a location that is displayed on the touch screen display.

At 904, the method 900 can include generating a request for target location data. The request for target location data can be based at least in part on the input from the user. For example, a user input to a map application (e.g., an input to contribute an image of a target location captured by a user device of the user) can be received by the computing device 102 which can then generate the request for the target location data associated with the target location.

In some embodiments, accessing the target location data (e.g., accessing the target location data as described in 704 of the method 700) can be based at least in part on the request for the target location data (e.g., the request for the target location data based at least in part on the input from the user). For example, the request for the target location data can cause the user computing device (e.g., the computing device 102) to access target location data that is stored on or accessible from the user device; and/or the request for the target location data can cause a remote computing device/remote computing system (e.g., the computing system 130) to access the target location data that is stored on or accessible from the remote computing device/remote computing system.

Figure 10:
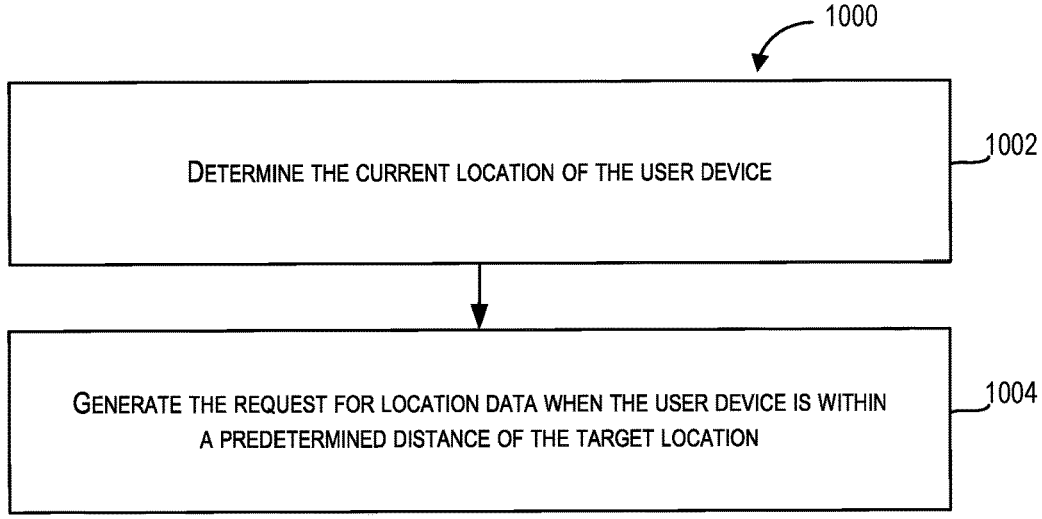
FIG. 10 depicts a flow diagram of augmented reality based generation of geolocalized images according to example embodiments of the present disclosure.

FIG. 10 depicts a flow diagram of augmented reality based generation of geolocalized images according to example embodiments of the present disclosure. One or more portions of the method 1000 can be executed and/or implemented on one or more computing devices or computing systems including, for example, the computing device 102, the computing system 130, the training computing system 150, and/or the computing device 200. Further, one or more portions of the method 1000 can be executed or implemented as an algorithm on the hardware devices or systems disclosed herein. In some embodiments, one or more portions of the method 1000 can be performed as part of the method 700 that is depicted in FIG. 7. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining a current location of the user device. For example, a computing device 102 can be configured to determine the location of the computing device 102 based at least in part on one or more signals received from a global positioning system satellite. By way of further example, the computing device 102 can determine the location of the computing device 102 based at least in part on triangulation of one or more signals received from a plurality of cellular communication towers.

At 1004, the method 1000 can include generating a request for target location data when the user device is within a predetermined distance of the target location. For example, the computing device 102 can generate the request for the target location data when the computing device 102 is within ten (10) meters of the target location though any suitable distance may be used as the predetermined distance (e.g., twenty (20) meters). By requiring the user device to be within a predetermined distance of a target location before generating the request for target location data, excessive demands for target location data when the target location data not within the field of view of the user device can be avoided. As such, the receipt of target location data at the user device can be avoided when the user device is too far away to be able to capture a high enough quality image of the target location. Further, the unnecessary receipt and storage of data on the user device can also be avoided.

In some embodiments, accessing the target location data (e.g., accessing the target location data as described in 704 of the method 700) can be based at least in part on the request for the target location data (e.g., the request for target location data when the user device is within the predetermined distance of the target location). For example, the request for the target location data can cause the user computing device (e.g., the computing device 102) to access target location data that is stored on or accessible from the user device; and/or the request for the target location data can cause a remote computing device/remote computing system (e.g., the computing system 130) to access the target location data that is stored on or accessible from the remote computing device/remote computing system.

Figure 11:
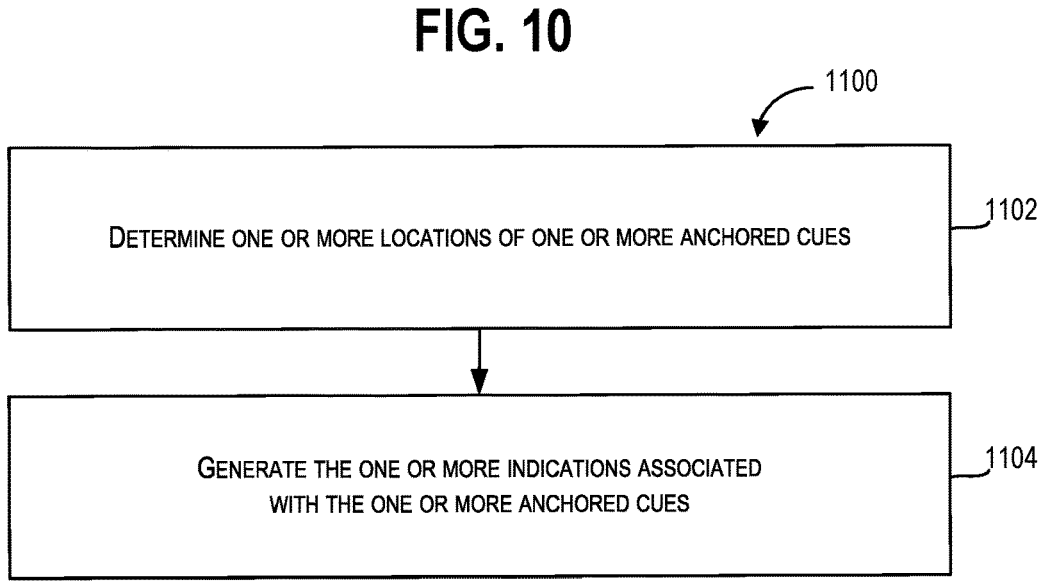
FIG. 11 depicts a flow diagram of augmented reality based generation of geolocalized images according to example embodiments of the present disclosure.

FIG. 11 depicts a flow diagram of augmented reality based generation of geolocalized images according to example embodiments of the present disclosure. One or more portions of the method 1100 can be executed and/or implemented on one or more computing devices or computing systems including, for example, the computing device 102, the computing system 130, the training computing system 150, and/or the computing device 200. Further, one or more portions of the method 1100 can be executed or implemented as an algorithm on the hardware devices or systems disclosed herein. In some embodiments, one or more portions of the method 1100 can be performed as part of the method 700 that is depicted in FIG. 7. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining one or more locations of one or more anchored cues respectively. For example, the computing device 102 can access target location data that includes information associated with the one or more locations (e.g., latitude, longitude, and/or altitude) of the one or more anchored cues and/or one or more identifiers of the one or more anchored cues. The one or more anchored cues can include one or more objects in an environment that are associated with one or more respective locations and which can also be associated with semantic information including one or more names and/or one or more object types.

At 1104, the method 1100 can include generating the one or more indications comprising the one or more locations of the one or more anchored cues relative to the target location. For example, if the one or more anchored cues include a statue and a park bench, the computing device 102 can generate one or more polygons around the images of the statue and/or the park bench, along with a textual indicator identifying the one or more anchored cues and providing an indication of the distance between each of the one or more anchored cues and the target location.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of geolocalized image generation, the computer-implemented method comprising:
   capturing, by a user device comprising one or more processors, an image of an environment which includes a target location;
   accessing, by the user device, target location data, wherein the target location data comprises information associated with the environment from which the target location is within a field of view of the user device;
   determining, by the user device, one or more objects which obstruct a view of the target location based on the image;
   determining, by the user device, based at least in part on the target location data and a spatial relationship between the one or more objects and the target location, at least one suitable position of the user device from which an unobstructed view of the target location is within the field of view of the user device and satisfies one or more criteria; and
   generating, by the user device, one or more indications and one or more images of the environment within the field of view of the user device, wherein the one or more indications are associated with positioning the user device in the at least one suitable position.

2. The computer-implemented method of claim 1, further comprising:
   capturing, by the user device, an image of the target location when the user device is in the at least one suitable position.

3. The computer-implemented method of claim 2, further comprising:
   updating, by the user device, the target location data based at least in part on the image of the target location when the user device is in the at least one suitable position.

4. The computer-implemented method of claim 1, further comprising:
   receiving, by the user device, an input from a user, wherein the input is associated with one or more interactions by the user with a search for the target location via a map application or a search application; and
   generating, by the user device, a request for the target location data based at least in part on the input from the user, wherein the accessing the target location data is based at least in part on the request.

5. The computer-implemented method of claim 1, further comprising:
   determining, by the user device, a current location of the user device; and
   generating, by the user device, a request for the target location data when the user device is within a predetermined distance of the target location, wherein the accessing the target location data is based at least in part on the request.

6. The computer-implemented method of claim 1, wherein the target location data comprises information associated with one or more locations of one or more entrances, one or more locations of one or more exits, or one or more locations of one or more signs.

7. The computer-implemented method of claim 1, wherein the determining, by the user device, based at least in part on the target location data and the spatial relationship between the one or more objects and the target location, the at least one suitable position of the user device from which the unobstructed view of the target location that satisfies the one or more criteria is within the field of view of the user device comprises:
   determining, by the user device, based at least in part on the target location data, at least one location and orientation of the user device relative to the target location from which the unobstructed view of the target location is within the field of view of the user device, wherein the orientation comprises a yaw, pitch, and roll of the user device.

8. The computer-implemented method of claim 1, wherein the determining, by the user device, based at least in part on the target location data and the spatial relationship between the one or more objects and the target location, the at least one suitable position of the user device from which the unobstructed view of the target location that satisfies the one or more criteria is within the field of view of the user device comprises:
   determining, by the user device, based at least in part on application of one or more optical character recognition techniques, that the user device is in the suitable position when the unobstructed view of one or more portions of predetermined text is located within a predetermined distance of the target location is within the field of view of the user device.

9. The computer-implemented method of claim 1, wherein the determining, by the user device, based at least in part on the target location data and the spatial relationship between the one or more objects and the target location, the at least one suitable position of the user device from which the unobstructed view of the target location that satisfies the one or more criteria is within the field of view of the user device comprises:
   detecting, by the user device, that the one or more objects are within a predetermined distance of the target location; and
   determining, by the user device, the at least one suitable position of the user device from which an image of the target location can be captured without being obstructed by the one or more objects.

10. The computer-implemented method of claim 1, wherein the determining, by the user device, based at least in part on the target location data and the spatial relationship between the one or more objects and the target location, the at least one suitable position of the user device from which the unobstructed view of the target location that satisfies the one or more criteria is within the field of view of the user device comprises:
    determining, by the user device, based at least in part on one or more machine-learned models, when one or more key features are within the field of view of the user device; and
    determining, by the user device, that the one or more key features are within the field of view of the user device from the at least one suitable location.

11. The computer-implemented method of claim 10, wherein the one or more key features comprise an entrance, an exit, or signage associated with the target location.

12. The computer-implemented method of claim 1, wherein satisfying the one or more criteria comprises a brightness of the target location exceeding a brightness threshold, an angle of the target location relative to the user device being within a range of suitable angles, or a distance from the user device to the target location being within a range of suitable distances.

13. The computer-implemented method of claim 1, wherein the target location data comprises one or more anchored cues associated with one or more reference objects in the environment that are within a predetermined distance of the target location, and wherein the generating, by the user device, the one or more indications and the one or more images of the environment within the field of view of the user device comprises:
    determining, by the user device, one or more locations of the one or more anchored cues respectively; and
    generating, by the user device, the one or more indications comprising the one or more locations of the one or more anchored cues relative to the target location.

14. The computer-implemented method of claim 1, wherein the one or more indications comprise one or more highlighted indications around the target location.

15. One or more tangible, non-transitory computer-readable media storing computer-readable instructions that when executed by one or more processors cause the one or more processors to perform operations, the operations comprising:
    capturing, by a user device, an image of an environment which includes a target location;
    accessing target location data, wherein the target location data comprises information associated with the environment from which the target location is within a field of view of the user device;
    determining one or more objects which obstruct a view of the target location based on the image;

determining, based at least in part on the target location data and a spatial relationship between the one or more objects and the target location, at least one suitable position of the user device from which an unobstructed view of the target location is within the field of view of the user device and satisfies one or more criteria; and generating one or more indications and one or more images of the environment within the field of view of the user device, wherein the one or more indications are associated with positioning the user device in the at least one suitable position.

16. The one or more tangible non-transitory computer-readable media of claim 15, wherein the target location data is received from a remote computing device and comprises a request for confirmation of one or more states of the target location, and wherein the one or more states of the target location comprise one or more identifiers associated with the target location or one or more hours of operation associated with the target location.

17. The one or more tangible non-transitory computer-readable media of claim 15, wherein the one or more indications comprise one or more indications associated with prompting a user of the user device to confirm that the unobstructed view of the target location that satisfies one or more criteria is within the field of view of the user device.

18. A computing system comprising:
one or more processors;
one or more non-transitory computer-readable media storing instructions that when executed by the one or more processors cause the one or more processors to perform operations comprising:
capturing, by a user device, an image of an environment which includes a target location;
accessing target location data, wherein the target location data comprises information associated with the environment from which the target location is within a field of view of the user device;
determining one or more objects which obstruct a view of the target location based on the image;
determining, based at least in part on the target location data and a spatial relationship between the one or more objects and the target location, at least one suitable position of the user device from which an unobstructed view of the target location is within the field of view of the user device and satisfies one or more criteria; and
generating one or more indications and one or more images of the environment within the field of view of the user device, wherein the one or more indications are associated with positioning the user device in the at least one suitable position.

19. The computing system of claim 18, wherein the user device is an augmented reality device comprising one or more sensors, augmented reality eyewear, or one or more display devices, and wherein the one or more sensors comprise one or more cameras, one or more light detection and ranging (LiDAR) devices, one or more sonar devices, or one or more radar devices.

20. The computing system of claim 18, wherein the one or more indications are superimposed over the one or more images of the target location, and wherein the one or more indications are brighter than the one or more images of the target location.

* * * * *